(12) United States Patent
Xiong et al.

(10) Patent No.: US 11,871,419 B2
(45) Date of Patent: Jan. 9, 2024

(54) MULTI-TRANSMISSION TIME INTERVAL (TTI) SCHEDULING FOR DATA TRANSMISSION

(71) Applicant: Intel Corporation, Santa Clara, CA (US)

(72) Inventors: Gang Xiong, Portland, OR (US); Yingyang Li, Beijing (CN); Gregory Morozov, Nizhny Novgorod (RU); Daewon Lee, Portland, OR (US)

(73) Assignee: Intel Corporation, Santa Clara, CA (US)

(*) Notice: Subject to any disclaimer, the term of this patent is extended or adjusted under 35 U.S.C. 154(b) by 206 days.

(21) Appl. No.: 16/951,926

(22) Filed: Nov. 18, 2020

(65) Prior Publication Data
US 2021/0092759 A1    Mar. 25, 2021

Related U.S. Application Data

(60) Provisional application No. 62/942,646, filed on Dec. 2, 2019, provisional application No. 62/937,687, filed on Nov. 19, 2019.

(51) Int. Cl.
*H04W 72/23* (2023.01)
*H04L 5/00* (2006.01)
*H04L 1/1812* (2023.01)
*H04W 72/0446* (2023.01)

(52) U.S. Cl.
CPC ........... *H04W 72/23* (2023.01); *H04L 1/1812* (2013.01); *H04L 5/0048* (2013.01); *H04W 72/0446* (2013.01)

(58) Field of Classification Search
CPC .......... H04W 72/1289; H04W 72/0446; H04L 1/1812; H04L 5/0048; H04L 1/1854; H04L 1/1819; H04L 1/1822; H04L 1/1614; H04L 5/0044; H04L 5/0053
See application file for complete search history.

(56) References Cited

U.S. PATENT DOCUMENTS

| | | | |
|---|---|---|---|
| 2018/0167932 A1* | 6/2018 | Papasakellariou | .... H04L 1/1861 |
| 2018/0242317 A1* | 8/2018 | Marinier | ............... H04L 1/1896 |
| 2019/0149271 A1* | 5/2019 | Yin | ........................ H04L 1/1861 |
| | | | 370/329 |
| 2020/0413427 A1* | 12/2020 | Khoshnevisan | ...... H04L 1/1896 |
| 2022/0150832 A1* | 5/2022 | Yang | ....................... H04W 72/23 |
| 2022/0174707 A1* | 6/2022 | Kim | .................. H04W 72/1273 |

FOREIGN PATENT DOCUMENTS

WO    WO-2018031623 A1 *    2/2018

OTHER PUBLICATIONS

Sony on transmission of multiple DL transport blocks 3GPP TSG RAN WG1 Meeting #96: R1-1902193 Mar. 2019 (Year: 2019).*
U.S. Appl. No. 62/868,168 Corresponding to US 20200413427 filed Jun. 2019 (Year: 2019).*
U.S. Appl. No. 62/931,756 Yang et al. (US 20220150832) filed Jun. 11, 2019 (Year: 2019).*

* cited by examiner

*Primary Examiner* — Rina C Pancholi
(74) *Attorney, Agent, or Firm* — Schwabe, Williamson & Wyatt, P.C.

(57) ABSTRACT

Various embodiments herein are directed to multi-Transmission Time Interval (TTI) scheduling for data transmission for system operating above the 52.6 GHz carrier frequency. Other embodiments may be disclosed and/or claimed.

20 Claims, 16 Drawing Sheets

940

MULTI-TRANSMISSION TIME INTERVAL (TTI) SCHEDULING FOR DATA TRANSMISSION

CROSS REFERENCE TO RELATED APPLICATION

The present application claims priority to U.S. Provisional Patent Application No. 62/937,687, which was filed Nov. 19, 2019; U.S. Provisional Patent Application No. 62/942,646, which was filed Dec. 2, 2019; the disclosures of which are hereby incorporated by reference.

FIELD

Embodiments relate generally to the technical field of wireless communications.

BACKGROUND

For new radio (NR) systems, one slot has 14 symbols. For systems operating above 52.6 GHz carrier frequency, if a larger subcarrier spacing, e.g., 1.92 MHz or 3.84 MHz is employed, the slot duration can be very short. For instance, for 1.92 MHz subcarrier spacing, one slot duration is approximately 7.8 µs as shown in FIG. 1. This extremely short slot duration may not be sufficient for higher layer processing, including Medium Access Layer (MAC) and Radio Link Control (RLC), etc. In this case, certain mechanisms may need to be defined to allow long transmission duration and adequate processing time for higher layer or even scheduler implementation.

Among other things, embodiments of the present disclosure are directed to designs for multi-Transmission Time Interval (TTI) scheduling for data transmission for system operating above the 52.6 GHz carrier frequency.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Mobile communication has evolved significantly from early voice systems to today's highly sophisticated integrated communication platform. The next generation wireless communication system, fifth generation (5G), or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simpler, and more seamless wireless connectivity solutions. NR will enable everything connected by wireless and deliver fast, rich content and services.

Figure 1:
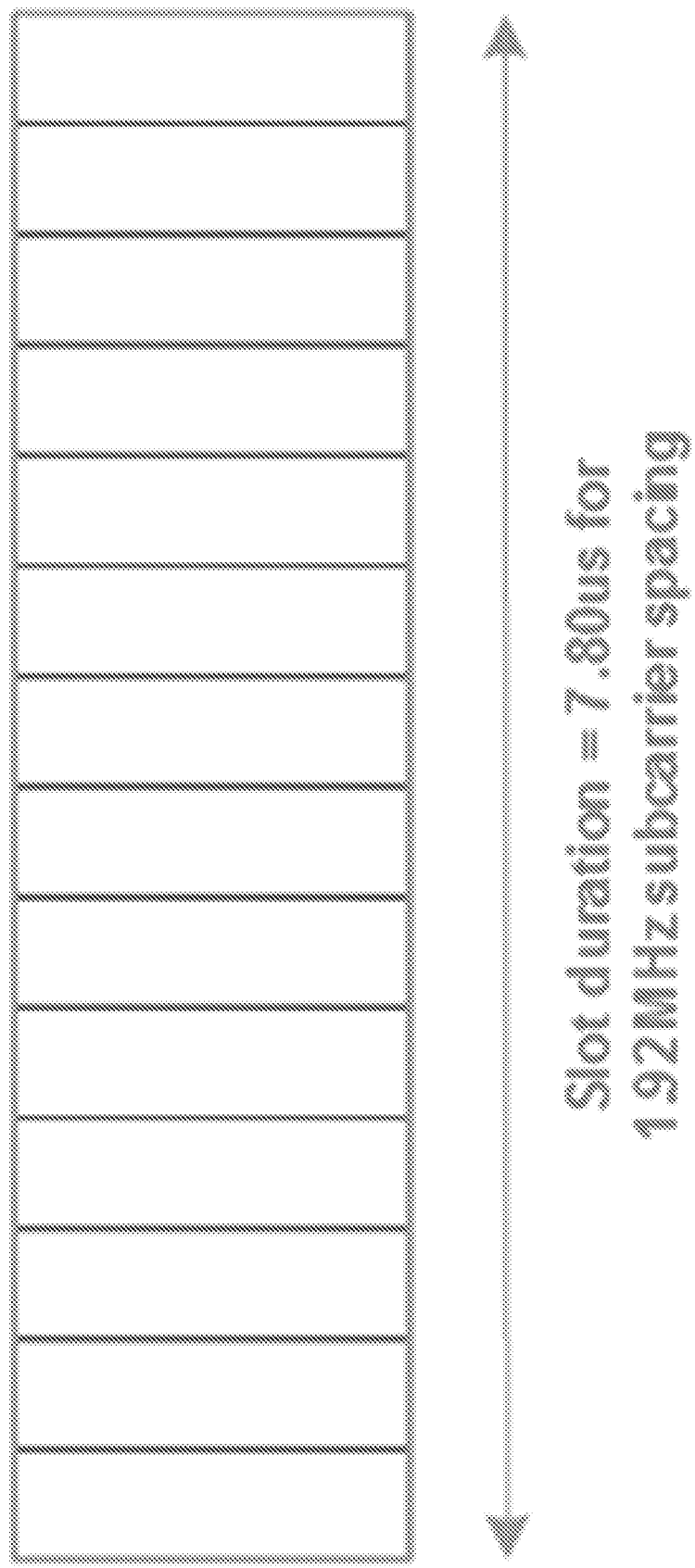
FIG. 1 illustrates an example of a short slot duration of a larger subcarrier spacing in accordance with various embodiments.

As defined in NR, one slot has 14 symbols. For systems operating above 52.6 GHz carrier frequency, if larger subcarrier spacing, e.g., 1.92 MHz or 3.84 MHz is employed, the slot duration can be very short. For instance, for 1.92 MHz subcarrier spacing, one slot duration is approximately 7.8 µs as shown in FIG. 1. This extremely short slot duration may not be sufficient for higher layer processing, including Medium Access Layer (MAC) and Radio Link Control (RLC), etc. In this case, certain mechanisms may need to be defined to allow long transmission duration and adequate processing time for higher layer or even scheduler implementation.

Among other things, embodiments of the present disclosure are directed to designs for multi-Transmission Time Interval (TTI) scheduling for data transmission for system operating above the 52.6 GHz carrier frequency.

Multi-TTI Scheduling for Data Transmission

As mentioned above, for systems operating above 52.6 GHz carrier frequency, if larger subcarrier spacing, e.g., 1.92 MHz or 3.84 MHz is employed, the slot duration can be very short. For instance, for 1.92 MHz subcarrier spacing, one slot duration is approximately 7.8 µs. This extremely short slot duration may not be sufficient for the processing of higher layer, including MAC and RLC, etc. In this case, certain mechanisms may need to be defined to allow long transmission duration and adequate processing time for higher layer.

For practical implementation of scheduler, a long scheduling unit may be considered for the transmission of data channel. In one embodiment, a physical downlink control channel (PDCCH) carrying downlink control information (DCI) may be used to schedule one or more physical downlink shared channel (PDSCH) or physical uplink shared channel (PUSCH) with different transport block (TBs) in different slots.

Figure 2:
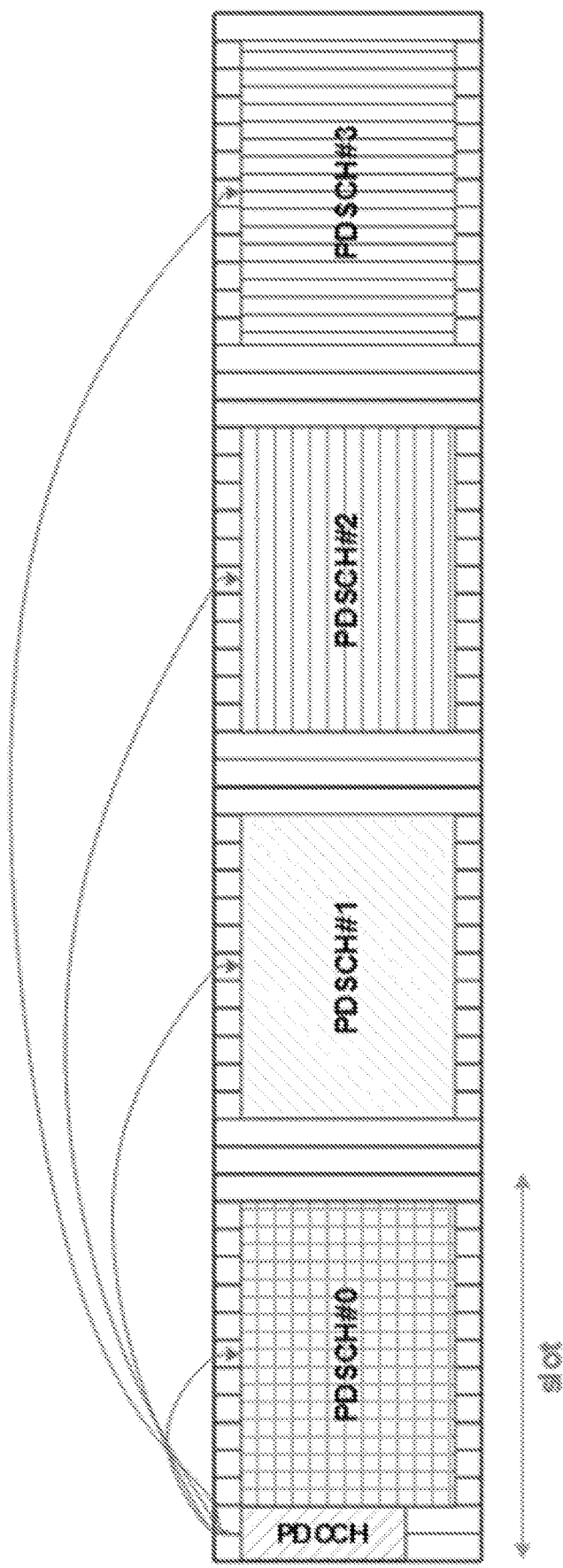
FIG. 2 illustrates an example of multi-TTI scheduling for PDSCHs, in accordance with various embodiments.

FIG. 2 illustrates one example of multi-TTI scheduling for PDSCHs. In the example, 4 PDSCHs (PDSCH #0-3) with different transport blocks (TB) are scheduled by a single DCI.

Figure 3:
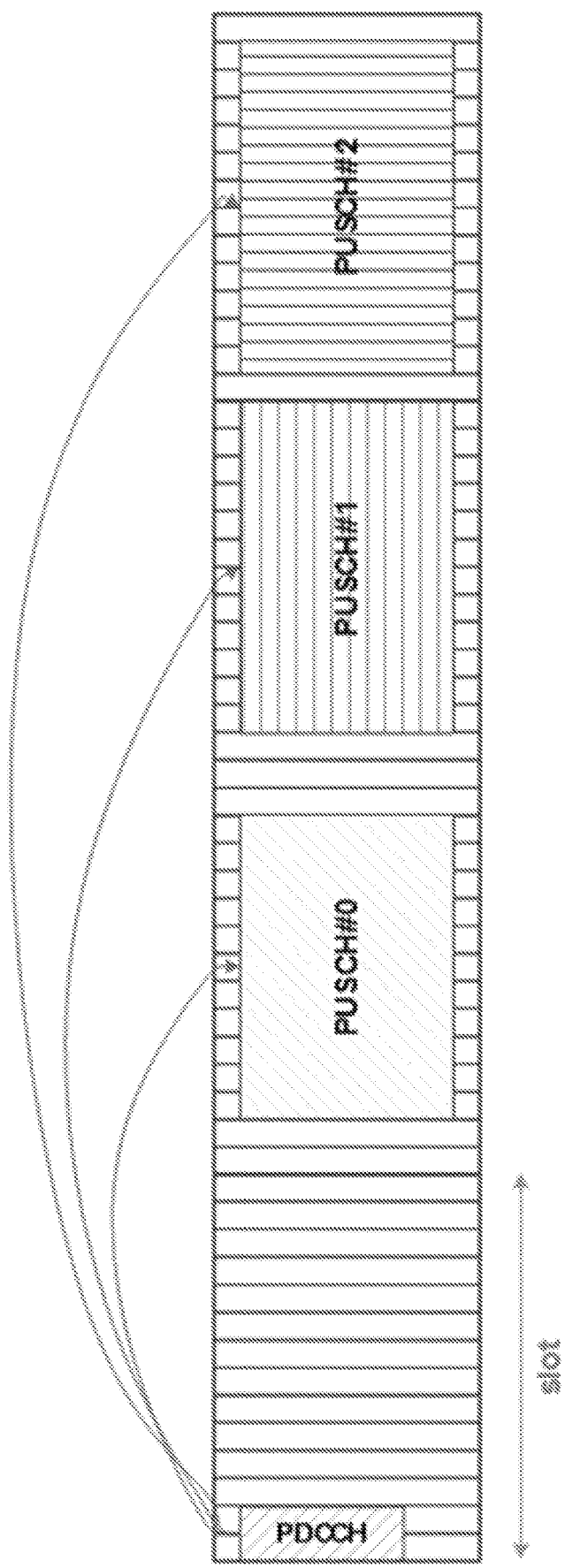
FIG. 3 illustrates an example of multi-TTI scheduling for PUSCHs, in accordance with various embodiments.

FIG. 3 illustrates one example of multi-TTI scheduling for PUSCHs. In the example, 3 PUSCHs (PUSCH #0-2) with different transport blocks (TB) are scheduled by a single DCI.

In one embodiment, in the DCI for scheduling multiple PDSCHs and/or PUSCHs with different TBs, each PDSCH and/or PUSCH may be scheduled within a slot. In this case, the transport block size calculation may be reused based on NR Rel-15.

Further, in the DCI for scheduling multiple PDSCHs and/or PUSCHs with different TBs, some fields in the DCI may be common for the scheduling of multiple PDSCHs and/or PUSCHs, while other fields may be independent for the scheduling of multiple PDSCHs and/or PUSCHs.

In one option, carrier indicator and bandwidth part (BWP) indicator for scheduled PDSCHs and/or PUSCHs with different TBs may be the same. This indicates that a same component carrier (CC) and BWP is used for the transmission of PDSCHs and/or PUSCHs with different TBs.

In one option, frequency domain resource allocation for scheduled PDSCHs and/or PUSCHs with different TBs may be the same. In other words, a single frequency domain resource assignment in the DCI is applied for all the scheduled PDSCHs and/or PUSCHs.

In one option, the same demodulation reference signal (DMRS) configuration including a single antenna ports and DMRS sequence initialization can be applied for the transmission of all the scheduled PDSCHs and/or PUSCHs. The DMRS sequence applied to each scheduled PDSCH and/or PUSCH could be separately derived.

In one option, a single transmission configuration indication (TCI) can be applied for the transmission of all the scheduled PDSCHs. This indicates that the same TCI is applied for all scheduled PDSCHs.

In one option, a single sounding reference signal (SRS) resource indicator can be applied for the transmission of all the scheduled PUSCHs. This indicates that the same TCI is applied for all scheduled PUSCHs.

In one embodiment, a new data indicator (NDI) may be independent for each scheduled PDSCH and/or PUSCH with different TBs. In particular, a bitmap may be defined, where each bit is used for the NDI of each scheduled PDSCH and/or PUSCH with different TBs. The size of bitmap may be configured by higher layers via NR minimum system information (MSI), NR remaining minimum system information (RMSI), NR other system information (OSI) or radio resource control (RRC) signalling, or determined in accordance with the number of scheduled PDSCHs and/or PUSCHs or the maximum number of PDSCHs or PUSCHs that can be scheduled by a single DCI. For the latter case, when the number of actually scheduled PDSCHs and/or PUSCHs is less than the maximum number, the remaining bits in the bitmap may be reserved, e.g., as "0".

In one option, a redundancy version (RV) may be independent for each scheduled PDSCH and/or PUSCH with different TBs. The same mechanism for NDI may be applied for RV for each scheduled PDSCH and/or PUSCH with different TBs.

Note that in cases where two TBs are scheduled for each scheduled PDSCH and/or PUSCH, two sets of NDI and RVs may be included in the DCI for each TB of the scheduled PDSCH and/or PUSCH.

In one embodiment, the DCI could schedule $N \cdot M$ PDSCHs and/or PUSCHs. N TBs are scheduled by the DCI with each TB mapped to M consecutive PDSCHs and/or PUSCHs. NDI could be indicated for each TB separately. Correspondingly, RV could be indicated for each TB separately. The M consecutive PDSCHs and/or PUSCHs mapped by same TB shares the same NDI and RV.

In one option, a TB could be divided into $M \cdot L$ code block groups (CBGs), then each of the M PDSCHs and/or PUSCHs carries L CBGs.

In one option, the number of CBG in each of the M PDSCHs and/or PUSCHs of a TB could be separately determined. For example, number of CBGs depends on the amount of time/frequency resource of a PDSCH or PUSCH.

In one option, the TB size (TBS) is determined by the total amount of the M PDSCHs and/or PUSCHs of a TB. The TB is then divided into at least M CBGs and mapped to the M PDSCHs and/or PUSCHs.

In one option, the number of bits carried by each of the M PDSCHs and/or PUSCHs of a TB is respectively determined. The M numbers are summed to get TBS of the TB. Herein, the number of bits carried by a PDSCH and/or PUSCH could equal the TBS for a TB which is only mapped to the PDSCH and/or PUSCH.

In one embodiment, a single modulation and coding scheme (MCS) field may be included in the DCI, which can be used to indicate the MCS of all the scheduled PDSCHs and/or PUSCHs. In one option, it can be used to indicate the MCS of the initial and retransmission of the scheduled PDSCHs and/or PUSCHs. In another option, it can be used to indicate the MCS of only the initial transmission of the scheduled PDSCHs and/or PUSCHs. Further, the MCS of the retransmission of the scheduled PDSCHs and/or PUSCHs may follow that of the initial transmission. In another option, it can be used to indicate the TBS and modulation order of the initial transmission of the scheduled PDSCHs and/or PUSCHs. For the retransmission of the scheduled PDSCHs and/or PUSCHs, the modulation order can be indicated by the MCS field, meanwhile the TBS may follow that of the initial transmission. In another option, the MCS may be separately indicated for each scheduled PDSCH and/or PUSCH.

In one embodiment, a HARQ process number can be different for scheduled PDSCHs and/or PUSCHs. In one option, a single HARQ process number field can be included in the DCI. The HARQ process number field is used to indicate the HARQ process number of the first PDSCH and/or PUSCH, while the HARQ process numbers for the remaining scheduled PDSCHs and/or PUSCHs can be implicitly determined in accordance with the indicated HARQ process number for the first PDSCH and/or PUSCH. In one option, the HARQ process numbers for the remaining scheduled PDSCHs and/or PUSCHs can be incremented by 1 from the indicated HARQ process ID.

In one example, the HARQ process number indicated in the DCI is 3 and three PDSCHs are scheduled by the DCI. For this option, HARQ process number for the first scheduled PDSCHs is 3 and for the second and third PDSCHs is 4 and 5, respectively.

In another option, a list of HARQ process number set can be configured by higher layers via MSI, RMSI, OSI or RRC signalling for multiple scheduled PDSCHs, and a field in the DCI may be used to indicate which one is selected for HARQ process number of each scheduled PDSCHs.

In one example, a list of HARQ process number set can be configured as {1, 3, 5, 7} for the first set and {2, 4, 6, 8} for the second set, where field in the DCI with "0" can be used to indicate the HARQ process number of the 4 scheduled PDSCHs are 1, 3, 5, 7, respectively.

In one embodiment, for time domain resource allocation, several options may be considered for each scheduled PDSCH/PUSCH with different TBs.

In one option, for time domain resource assignment for PDSCH, k0 is used to indicate the slot offset between PDCCH and the first scheduled PDSCH. Similarly, for time domain resource assignment for PDSCH, k2 is used to indicate the slot offset between PDCCH and the first scheduled PUSCH.

In one option, the same starting and length indicator value (SLIV) and mapping type as part of time domain resource assignment are applied for each scheduled PDSCHs and/or PUSCHs. FIG. 3 illustrates one example of same SLIV for 4 scheduled PDSCHs.

In another option, different SLIV and mapping type as part of time domain resource assignment are applied for different scheduled PDSCHs and/or PUSCHs. In particular, for each time domain resource allocation configuration within a list of time domain resource allocation configurations, multiple SLIVs can be configured, which indicates the SLIV for each scheduled PDSCHs and/or PUSCHs with different TBs. The number of PDSCHs and/or PUSCHs allocated in a slot could be limited to 1, or could be more than 1.

Table 1 illustrates one example of configuring multiple SLIVs and mapping types for each scheduled PDSCHs in PDSCH-TimeDomainResourceAllocation IE.

TABLE 1

PDSCH-TimeDomainResourceAllocation for multiple SLIVs and mapping types for each scheduled PDSCH

```
PDSCH-TimeDomainResourceAllocation ::= SEQUENCE {
   k0                       INEGER (0 . . . 32)                              OPTIONAL, --Need S
   mappingTypeList          SEQUENCE (SIZE(1 . . . maxNrofScheduledPDSCHs))  OF mappingType ENUMERATED {typeA, typeB}
   startSymbolAndLengthList SEQUENCE (SIZE(1 . . . maxNrofScheduledPDSCHs))  OF startSymbolAndLength INTEGER (0 . . . 127)
```

Figure 4:
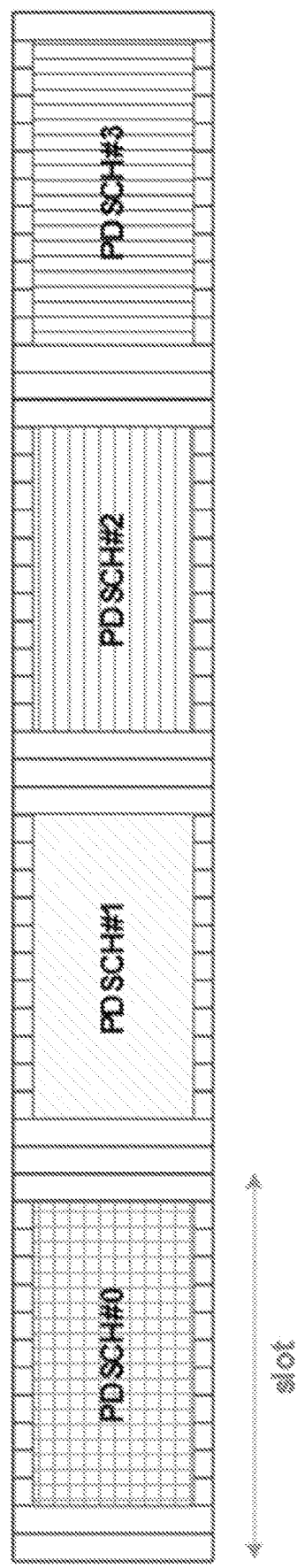
FIG. 4 illustrates an example with the same SLIV for scheduled PDSCHs, in accordance with various embodiments.

FIG. 4 illustrates one example of different SLIVs for 4 scheduled PDSCHs.

In another option, consecutive time domain resource allocation can be employed for the scheduled PDSCHs and/or PUSCHs with different TBs. In particular, partial slot resource allocation in time can be employed for the scheduled PDSCHs and/or PUSCHs in the first and last slot, respectively. Full slot resource allocation in time is employed for the scheduled PDSCHs and/or PUSCHs in the slots other than the first and last slot.

For this option, the SLIV for the first and last slot can be explicitly configured by the higher layers in time domain resource allocation configuration. Further, the number of scheduled PDSCHs and/or PUSCHs can be also included in the time domain resource allocation configuration. If the number of scheduled PD PDSCHs and/or PUSCHs is 1, the SLIV for the first slot could apply. Table 2 illustrates one example of configuring consecutive resource allocation in time for PDSCH-TimeDomainResourceAllocation.

TABLE 2

PDSCH-TimeDomainResourceAllocation for consecutive resource allocation in time

```
PDSCH-TimeDomainResourceAllocation : := SEQUENCE {
   k0                            INEGER (0 . . . 32)         OPTIONAL,  --Need S
   mappingType                   ENUMERATED {typeA, typeB},
   norfScheduledPDSCHs           INTEGER (0 . . . 8)
   startSymbolAndLengthFirstSlot INTEGER (0 . . . 127)
   startSymbolAndLengthLastSlot  INTEGER (0 . . . 127)
```

Figure 5:
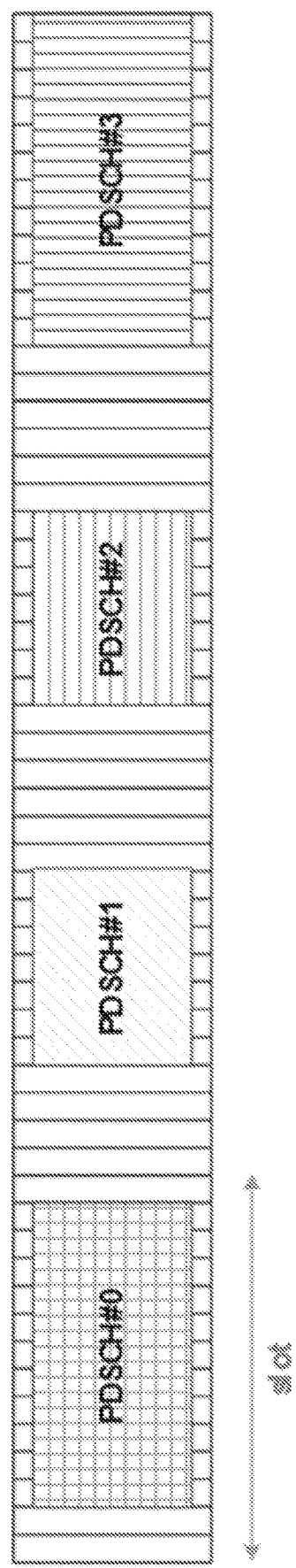
FIG. 5 illustrates an example of different SLIVs for scheduled PDSCHs, in accordance with various embodiments.

FIG. 5 illustrates one example of consecutive time domain resource allocation for scheduled PDSCHs. In this example, partial slot resource allocation in time is employed for the scheduled PDSCHs in the first and last slot, respectively. Full slot resource allocation in time is employed for the scheduled PDSCHs in the slots other than the first and last slot.

In one embodiment, number of scheduled PDSCHs and/or PUSCHs with different TBs may be configured by higher layers via MSI, RMSI, OSI or RRC signaling, or implicitly or explicitly indicated in the DCI or a combination thereof.

In one option, a set of number of scheduled PDSCH and/or PUSCHs with different TBs can be configured by higher layers via MSI, RMSI, OSI or RRC signalling, and further one field in the DCI may be used to explicitly indicate one value from the set of number of scheduled PDSCHs and/or PUSCHs with different TBs. In addition, this field may be configured as part of time domain resource allocation configuration.

In another option, for each time domain resource allocation configuration within a list of time domain resource allocation configurations, multiple SLIVs can be configured, which indicates the SLIV for each scheduled PDSCHs and/or PUSCHs with different TBs. In this case, the number of scheduled PDSCHs and/or PUSCHs can be determined in accordance with the number of SLIVs for the indicated time domain resource allocation by the DCI.

In one embodiment, the time/frequency resource for DMRS for the multiple scheduled PDSCHs and/or PUSCHs could be designed separately or jointly.

In one option, the time/frequency resource for DMRS is determined per each scheduled PDSCH or PUSCH separately. For example, a first symbol of the scheduled PDSCH or PUSCH carries DMRS. The number and positions of additional symbols for DMRS could depend on the length of the scheduled PDSCH or PUSCH, which could be predefined for configured by high layer.

In one option, the time/frequency resource for DMRS is determined assuming the time/frequency resource of all the multiple scheduled PDSCHs and/or PUSCHs as a whole. Assuming the same spatial precoder is applied in all the multiple scheduled PDSCHs and/or PUSCHs, the DMRS mapped to the time resource of a previous or later PDSCH or PUSCH could be used for the channel estimation of the current PDSCH/PUSCH. If the channel delay spread is small, it is possible DMRS could only be transmitted in the first symbol of each scheduled PDSCH or PUSCH. Further, it is possible DMRS could only be transmitted in the first symbol of every X scheduled PDSCH or PUSCH, X>1. The last PDSCH or PUSCH could have a special handling. Since there is no additional PDSCH or PUSCH for the same UE, i.e. it is not possible to do interpolation for channel estimation using DMRS from the additional PDSCH or PUSCH. One more symbol for DMRS could be transmitted at the ending symbol(s) of the last PDSCH or PUSCH.

In one option, if the multiple scheduled PDSCHs and/or PUSCHs occupy the continuous time resources. The time/frequency resource of DMRS could be determined assuming the multiple scheduled PDSCHs and/or PUSCHs as a long PDSCH or PUSCH. A first symbol of the long PDSCH or PUSCH carries DMRS. The number and positions of additional symbols for DMRS could depend on the length of the long PDSCH or PUSCH, which could be predefined for configured by high layer. Alternatively, a DMRS symbol could be allocated every X symbols. X could be predefined for configured by high layer.

In one embodiment, for multi-TTI scheduling for PDSCHs with different TBs, a single PUCCH resource indicator (PRI) may be used to indicate one or more PUCCH resources for carrying HARQ-ACK response of one or more scheduled PDSCHs.

Figure 6:
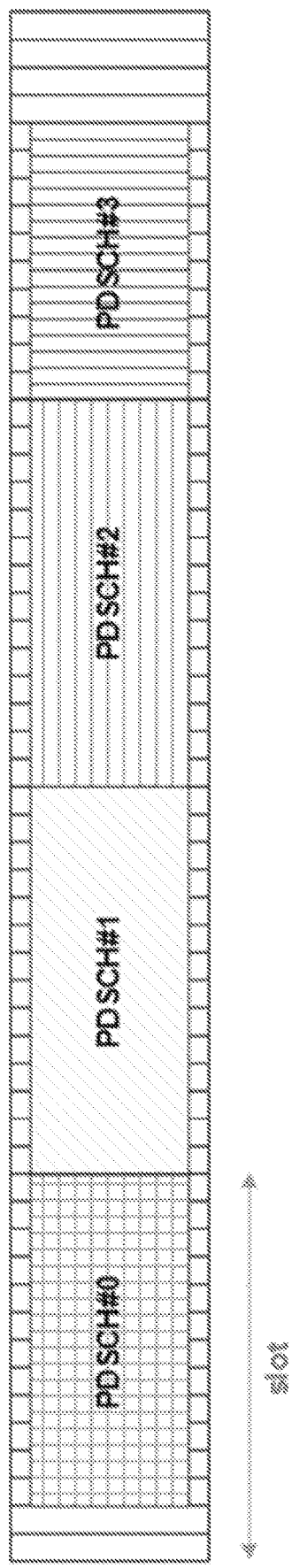
FIG. 6 illustrates an example of consecutive time domain resource allocation for scheduled PDSCHs, in accordance with various embodiments.

In one option, same PDSCH-to-HARQ_feedback timing indicator is used to indicate the slot offset between each scheduled PDSCH and each PUCCH carrying HARQ-ACK feedback of the corresponding PDSCH. FIG. 6 illustrates one example of multiple PUCCHs for carrying HARQ-ACK of each scheduled PDSCHs. In the example, 3 PUCCHs are indicated to carry HARQ-ACK feedback of PDSCH #0-2, respectively.

Figure 7:
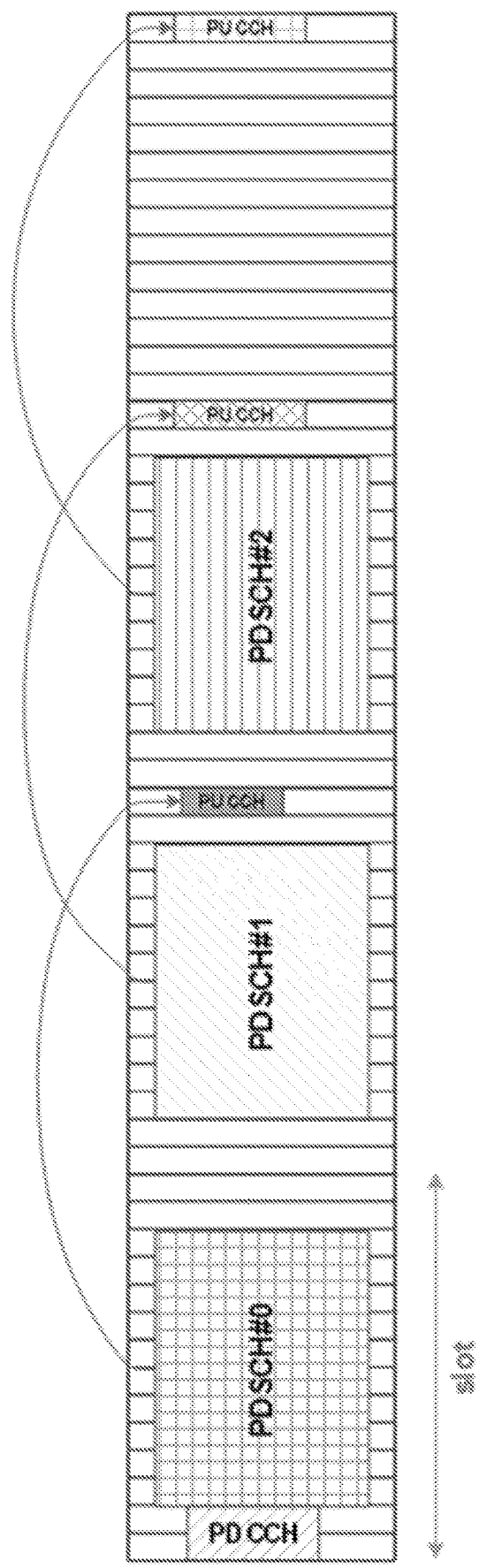
FIG. 7 illustrates an example of multiple PUCCHs for HARQ-ACK response, in accordance with various embodiments.
Figure 8:
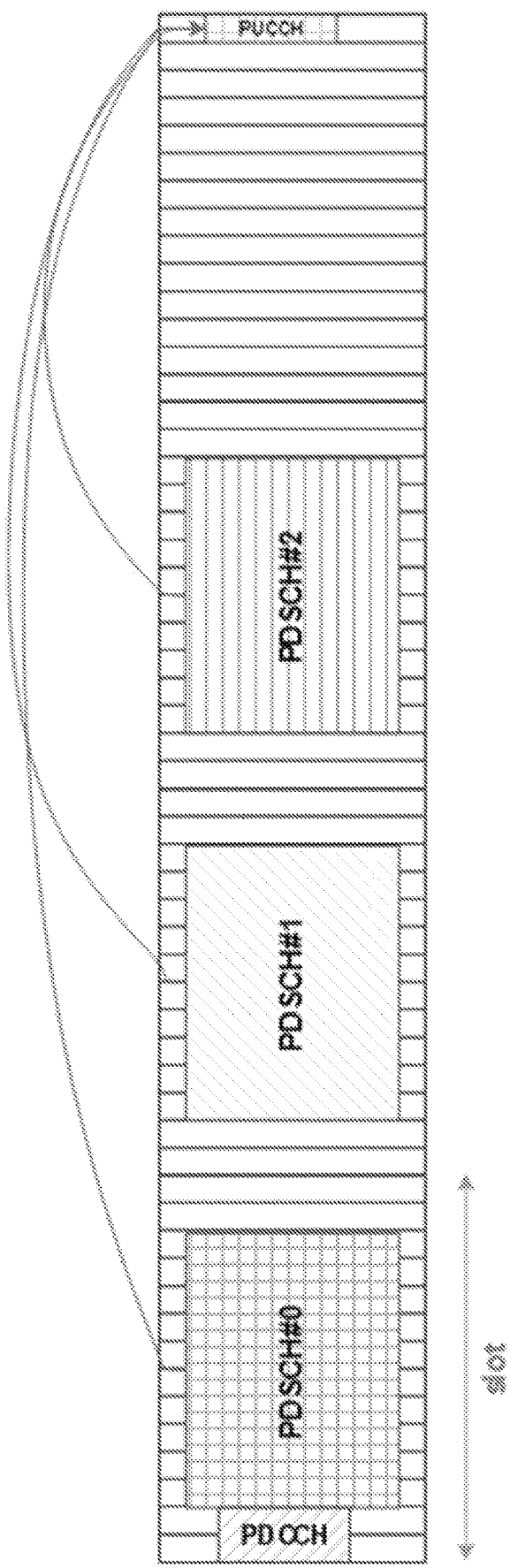
FIG. 8 illustrates an example of single PUCCH for HARQ-ACK response, in accordance with various embodiments.

In another option, a single PDSCH-to-HARQ_feedback timing indicator is used to indicate the slot offset between the last scheduled PDSCH and one PUCCH. The PUCCH is used to carry the HARQ-ACK of all scheduled PDSCHs. The HARQ-ACK feedback bit order is determined based on the scheduled PDSCH index. FIG. 7 illustrates one example of single PUCCH carrying HARQ-ACK response of all scheduled PDSCHs. In the example, a single PUCCH is used to carry 3 HARQ-ACK feedback bits for PDSCH #0-2.

Further, a single transmit power command (TPC) for PUCCH can be indicated in the DCI, where the TPC can be applied for one or more scheduled PUCCH carrying HARQ-ACK response.

In one embodiment of the disclosure, a dynamic HARQ-ACK codebook could be generated considering multi-TTI scheduling for PDSCH transmissions with multiple TBs. In Rel-15, two sub-codebooks are generated and concatenated to form the final HARQ-ACK codebook. One sub-codebook carries HARQ-ACK for all TB-based PDSCH scheduling, i.e. one or two HARQ-ACK bits are reported for each PDSCH. Whenever at least one cell or BWP is configured with PDSCH transmission with 2 TBs, UE generates two HARQ-ACK bits for each PDSCH. The other sub-codebook is for CBG based PDSCH scheduling. The different cells or BWPs may be configured with different number of CBGs per PDSCH. Therefore, the number of HARQ-ACK bits per PDSCH equals to the maximum number of CBGs per PDSCH among all configured cells or BWPs. Assuming a multi-TTI DCI could schedule maximum N TBs which each TB consists P CBGs. The maximum number of HARQ-ACK associated with a PDCCH is N·P. P could be equal to or larger than 1. The counter DAI and total DAI if included could still count the number of PDCCHs which schedules PDSCH transmissions belonging to the same sub-codebook.

In one option, two sub-codebooks are generated. The first sub-codebook carries HARQ-ACK bits for all TB based PDSCH transmissions scheduled by a DCI scheduling a single TTI. The number of HARQ-ACK bits associated with such a DCI is the maximum number of TBs which are scheduled by such DCIs. The first sub-codebook includes HARQ-ACK bits, For all PDSCHs transmitted on a cell configured with TB based PDSCH transmission and single-TTI scheduling;

For a PDSCH scheduled by a fallback DCI on a cell configured with CBG based transmission or multi-TTI scheduling. Herein, it is assumed a fallback DCI always schedules a single TTI.

The second sub-codebook carries HARQ-ACK bits for all other PDSCH transmissions, e.g. CBG-based PDSCH transmissions and PDSCH transmissions scheduled by a DCI scheduling multiple TTIs. The number of HARQ-ACK bits associated with such a DCI is the maximum number among Maximum number of CBGs scheduled by a DCI scheduling single TTI;

Maximum number of TBs scheduled by a DCI scheduling multiple TTIs without CBG based transmission;

Maximum total number of CBGs in the multiple TTIs scheduled by a DCI scheduling multiple TTIs with CBG based transmission.

In one option, two sub-codebooks are generated. The first sub-codebook carries HARQ-ACK bits for TB based PDSCH transmissions scheduled by a DCI scheduling one or two TBs. The number of HARQ-ACK bits associated with such a DCI is the maximum number of TBs which are scheduled by such DCIs. The first sub-codebook includes HARQ-ACK bits, For all PDSCHs transmitted on a cell configured with TB based PDSCH transmission and single-TTI scheduling;

For a PDSCH scheduled by a fallback DCI on a cell configured with CBG based transmission or multi-TTI scheduling. Herein, it is assumed a fallback DCI always schedules a single TTI;

For the one or two PDSCHs if the number of currently scheduled TB is one or two by a DCI scheduling multiple TTIs without CBG based transmission.

The second sub-codebook carries HARQ-ACK bits for all other PDSCH transmissions. The number of HARQ-ACK bits associated with such a DCI is the maximum number among Maximum number of CBGs scheduled by a DCI scheduling single TTI;

Maximum number of TBs scheduled by a DCI scheduling multiple TTIs without CBG based transmission;

Maximum total number of CBGs in the multiple TTIs scheduled by a DCI scheduling multiple TTIs with CBG based transmission.

In one option, two sub-codebooks are generated. The first sub-codebook carries HARQ-ACK bits for PDSCH transmissions scheduled by a DCI scheduling one or two TBs or two CBGs. The number of HARQ-ACK bits associated with such a DCI is the maximum number of TBs or CBGs which are scheduled by such DCIs. The first sub-codebook includes HARQ-ACK bits, For all PDSCHs transmitted on a cell configured with TB based PDSCH transmission and single-TTI scheduling;

For a PDSCH scheduled by a fallback DCI on a cell configured with CBG based transmission or multi-TTI scheduling. Herein, it is assumed a fallback DCI always schedules a single TTI;

For the one or two PDSCHs if the number of currently scheduled TB is one or two by a DCI scheduling multiple TTIs without CBG based transmission;

For the two configured CBGs scheduled by a DCI scheduling one TB with two configured CBGs in a single TTI.

The second sub-codebook carries HARQ-ACK bits for all other PDSCH transmissions. The number of HARQ-ACK bits associated with such a DCI is the maximum number among Maximum number of CBGs scheduled by a DCI scheduling single TTI;

Maximum number of TBs scheduled by a DCI scheduling multiple TTIs without CBG based transmission;

Maximum total number of CBGs in the multiple TTIs scheduled by a DCI scheduling multiple TTIs with CBG based transmission.

Systems and Implementations

Figure 10:
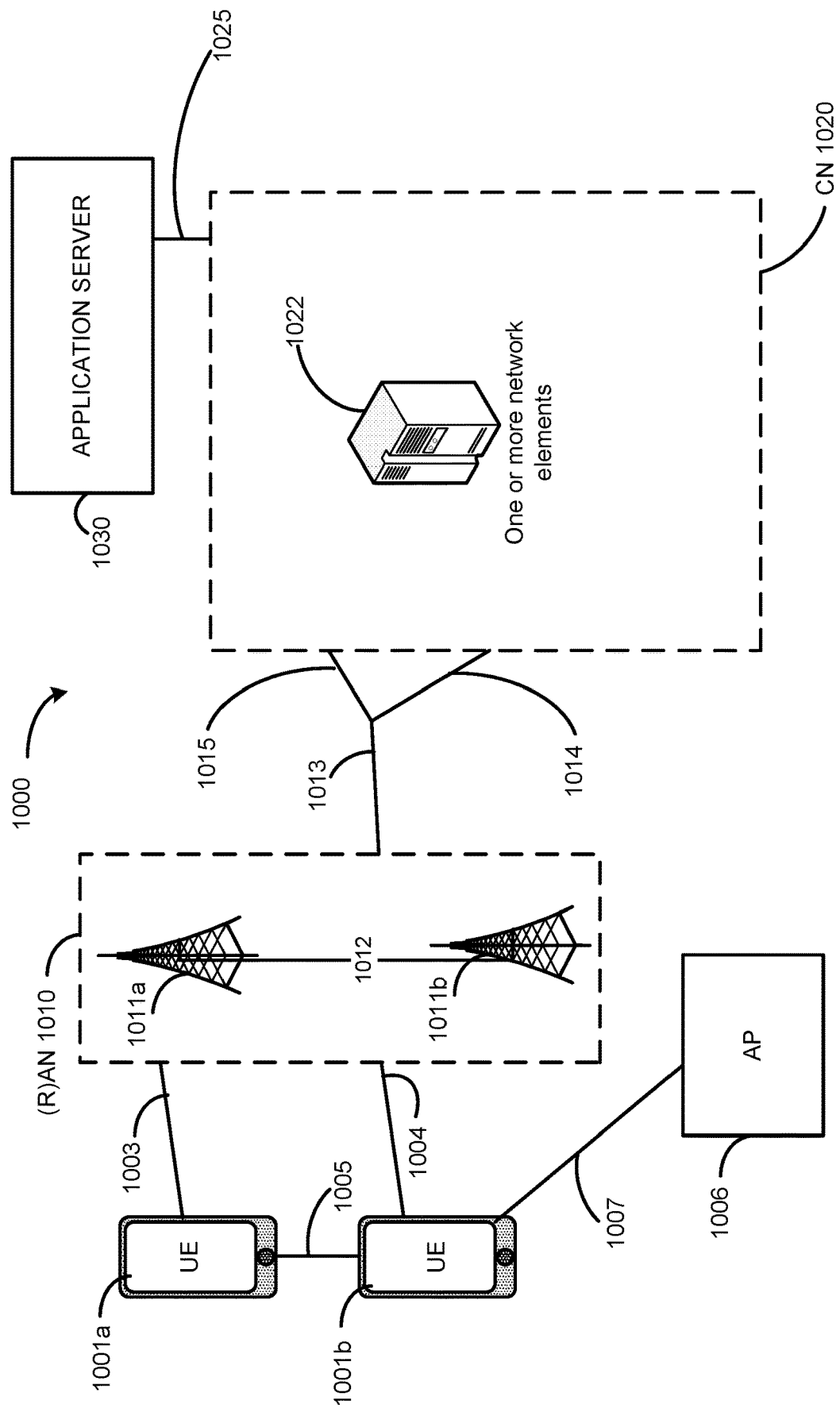
FIG. 10 illustrates an example architecture of a system of a network, in accordance with various embodiments.

FIG. 10 illustrates an example architecture of a system 1000 of a network, in accordance with various embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 10, the system 1000 includes UE 1001a and UE 1001b (collectively referred to as "UEs 1001" or "UE 1001"). In this example, UEs 1001 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1001 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 may be configured to connect, for example, communicatively couple, with an or RAN 1010. In embodiments, the RAN 1010 may be an NG RAN or a 5G RAN, an E-UTRAN, or a legacy RAN, such as a UTRAN or GERAN. As used herein, the term "NG RAN" or the like may refer to a RAN 1010 that operates in an NR or 5G system 1000, and the term "E-UTRAN" or the like may refer to a RAN 1010 that operates in an LTE or 4G system 1000. The UEs 1001 utilize connections (or channels) 1003 and 1004, respectively, each of which comprises a physical communications interface or layer (discussed in further detail below).

In this example, the connections 1003 and 1004 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1001 may directly exchange communication data via a ProSe interface 1005. The ProSe interface 1005 may alternatively be referred to as a SL interface 1005 and may comprise one or more logical channels, including but not limited to a PSCCH, a PSSCH, a PSDCH, and a PSBCH.

The UE 1001b is shown to be configured to access an AP 1006 (also referred to as "WLAN node 1006," "WLAN 1006," "WLAN Termination 1006," "WT 1006" or the like) via connection 1007. The connection 1007 can comprise a local wireless connection, such as a connection consistent with any IEEE 802.11 protocol, wherein the AP 1006 would comprise a wireless fidelity (Wi-Fi®) router. In this example, the AP 1006 is shown to be connected to the Internet without connecting to the core network of the wireless system (described in further detail below). In various embodiments, the UE 1001*b*, RAN 1010, and AP 1006 may be configured to utilize LWA operation and/or LWIP operation. The LWA operation may involve the UE 1001*b* in RRC_CONNECTED being configured by a RAN node 1011*a-b* to utilize radio resources of LTE and WLAN. LWIP operation may involve the UE 1001*b* using WLAN radio resources (e.g., connection 1007) via IPsec protocol tunneling to authenticate and encrypt packets (e.g., IP packets) sent over the connection 1007. IPsec tunneling may include encapsulating the entirety of original IP packets and adding a new packet header, thereby protecting the original header of the IP packets.

The RAN 1010 can include one or more AN nodes or RAN nodes 1011*a* and 1011*b* (collectively referred to as "RAN nodes 1011" or "RAN node 1011") that enable the connections 1003 and 1004. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1011 that operates in an NR or 5G system 1000 (for example, a gNB), and the term "E-UTRAN node" or the like may refer to a RAN node 1011 that operates in an LTE or 4G system 1000 (e.g., an eNB). According to various embodiments, the RAN nodes 1011 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1011 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1011; a MAC/PHY split wherein RRC, PDCP, RLC, and MAC layers are operated by the CRAN/vBBUP and the PHY layer is operated by individual RAN nodes 1011; or a "lower PHY" split wherein RRC, PDCP, RLC, MAC layers and upper portions of the PHY layer are operated by the CRAN/vBBUP and lower portions of the PHY layer are operated by individual RAN nodes 1011. This virtualized framework allows the freed-up processor cores of the RAN nodes 1011 to perform other virtualized applications. In some implementations, an individual RAN node 1011 may represent individual gNB-DUs that are connected to a gNB-CU via individual F1 interfaces (not shown by FIG. 10). In these implementations, the gNB-DUs may include one or more remote radio heads or RFEMs (see, e.g., FIG. 11A), and the gNB-CU may be operated by a server that is located in the RAN 1010 (not shown) or by a server pool in a similar manner as the CRAN/vBBUP. Additionally or alternatively, one or more of the RAN nodes 1011 may be next generation eNBs (ng-eNBs), which are RAN nodes that provide E-UTRA user plane and control plane protocol terminations toward the UEs 1001, and are connected to a 5GC via an NG interface (discussed infra).

In V2X scenarios one or more of the RAN nodes 1011 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1001 (vUEs 1001). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1011 can terminate the air interface protocol and can be the first point of contact for the UEs 1001. In some embodiments, any of the RAN nodes 1011 can fulfill various logical functions for the RAN 1010 including, but not limited to, radio network controller (RNC) functions such as radio bearer management, uplink and downlink dynamic radio resource management and data packet scheduling, and mobility management.

In embodiments, the UEs 1001 can be configured to communicate using OFDM communication signals with each other or with any of the RAN nodes 1011 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 to the UEs 1001, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1001 and the RAN nodes 1011 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1001 and the RAN nodes 1011 may operate using LAA, eLAA, and/or feLAA mechanisms. In these implementations, the UEs 1001 and the RAN nodes 1011 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1001 RAN nodes 1011, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1001, AP 1006, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1001 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1001. The PDCCH carries information about the transport format and resource allocations related to the PDSCH channel, among other things. It may also inform the UEs 1001 about the transport format, resource allocation, and HARQ information related to the uplink shared channel. Typically, downlink scheduling (assigning control and shared channel resource blocks to the UE 1001b within a cell) may be performed at any of the RAN nodes 1011 based on channel quality information fed back from any of the UEs 1001. The downlink resource assignment information may be sent on the PDCCH used for (e.g., assigned to) each of the UEs 1001.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1011 may be configured to communicate with one another via interface 1012. In embodiments where the system 1000 is an LTE system, the interface 1012 may be an X2 interface 1012. The X2 interface may be defined between two or more RAN nodes 1011 (e.g., two or more eNBs and the like) that connect to EPC 1020, and/or between two eNBs connecting to EPC 1020. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1001 from an SeNB for user data; information of PDCP PDUs that were not delivered to a UE 1001; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1000 is a 5G or NR system, the interface 1012 may be an Xn interface 1012. The Xn interface is defined between two or more RAN nodes 1011 (e.g., two or more gNBs and the like) that connect to 5GC 1020, between a RAN node 1011 (e.g., a gNB) connecting to 5GC 1020 and an eNB, and/or between two eNBs connecting to 5GC 1020. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1001 in a connected mode (e.g., CM-CONNECTED) including functionality to manage the UE mobility for connected mode between one or more RAN nodes 1011. The mobility support may include context transfer from an old (source) serving RAN node 1011 to new (target) serving RAN node 1011; and control of user plane tunnels between old (source) serving RAN node 1011 to new (target) serving RAN node 1011. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1010 is shown to be communicatively coupled to a core network—in this embodiment, core network (CN) 1020. The CN 1020 may comprise a plurality of network elements 1022, which are configured to offer various data and telecommunications services to customers/subscribers (e.g., users of UEs 1001) who are connected to the CN 1020 via the RAN 1010. The components of the CN 1020 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1020 may be referred to as a network slice, and a logical instantiation of a portion of the CN 1020 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1030 may be an element offering applications that use IP bearer resources with the core network (e.g., UMTS PS domain, LTE PS data services, etc.). The application server 1030 can also be configured to support one or more communication services (e.g., VoIP sessions, PTT sessions, group communication sessions, social networking services, etc.) for the UEs 1001 via the EPC 1020.

In embodiments, the CN 1020 may be a 5GC (referred to as "5GC 1020" or the like), and the RAN 1010 may be connected with the CN 1020 via an NG interface 1013. In embodiments, the NG interface 1013 may be split into two parts, an NG user plane (NG-U) interface 1014, which carries traffic data between the RAN nodes 1011 and a UPF, and the Si control plane (NG-C) interface 1015, which is a signaling interface between the RAN nodes 1011 and AMFs.

In embodiments, the CN 1020 may be a 5G CN (referred to as "5GC 1020" or the like), while in other embodiments, the CN 1020 may be an EPC). Where CN 1020 is an EPC (referred to as "EPC 1020" or the like), the RAN 1010 may be connected with the CN 1020 via an Si interface 1013. In embodiments, the S1 interface 1013 may be split into two parts, an S1 user plane (S1-U) interface 1014, which carries traffic data between the RAN nodes 1011 and the S-GW, and the S1-MME interface 1015, which is a signaling interface between the RAN nodes 1011 and MMES.

Figure 11A:
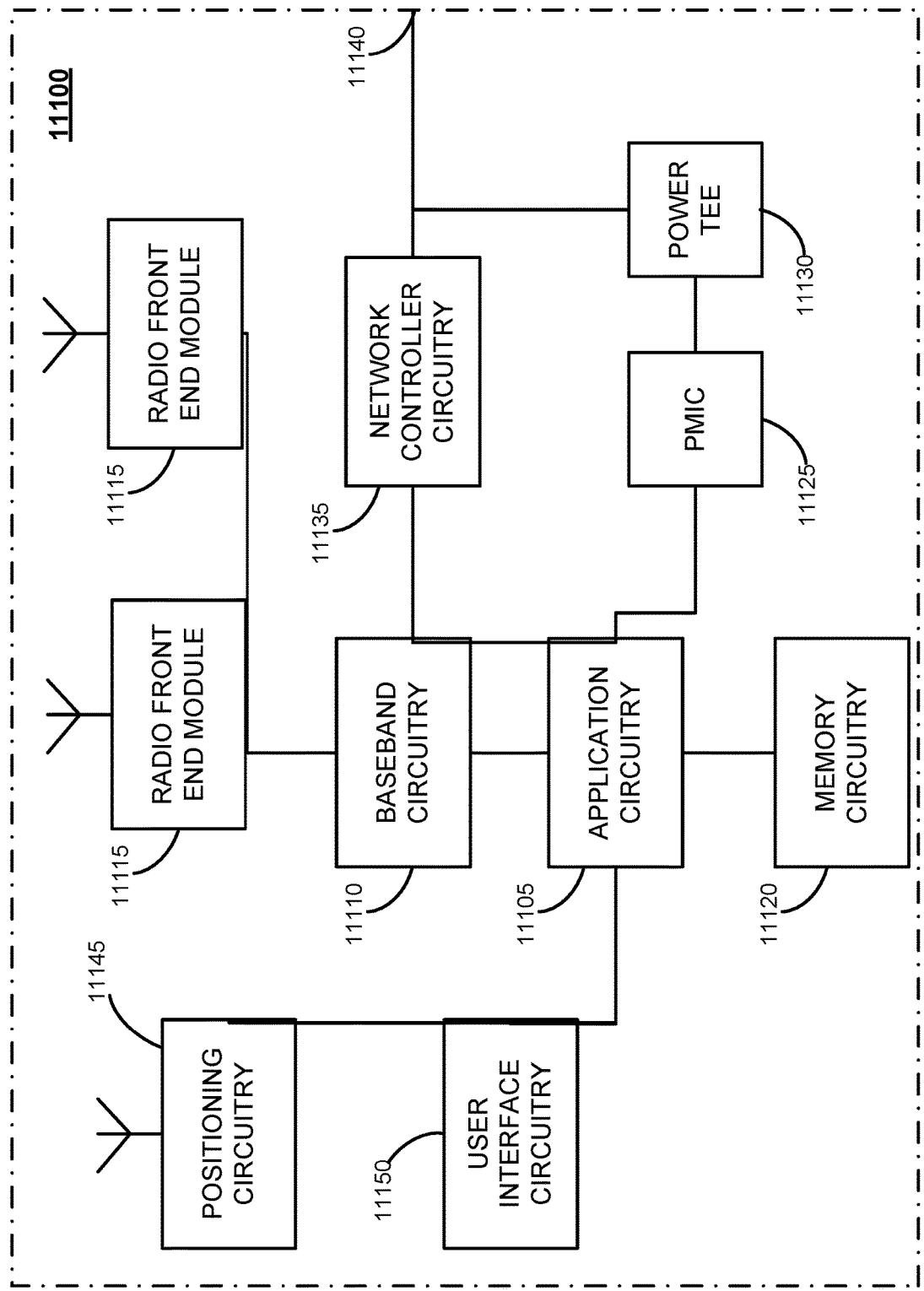
FIG. 11A illustrates an example of infrastructure equipment in accordance with various embodiments.

FIG. 11A illustrates an example of infrastructure equipment 11100 in accordance with various embodiments. The infrastructure equipment 11100 (or "system 11100") may be implemented as a base station, radio head, RAN node such as the RAN nodes 1011 and/or AP 1006 shown and described previously, application server(s) 1030, and/or any other element/device discussed herein. In other examples, the system 11100 could be implemented in or by a UE.

The system 11100 includes application circuitry 11105, baseband circuitry 11110, one or more radio front end modules (RFEMs) 11115, memory circuitry 11120, power management integrated circuitry (PMIC) 11125, power tee circuitry 11130, network controller circuitry 11135, network interface connector 11140, satellite positioning circuitry 11145, and user interface 11150. In some embodiments, the device 11100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 11105 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 11105 may be coupled with or may include memory/storage elements and may be configured to execute instructions stored in the memory/storage to enable various applications or operating systems to run on the system 11100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 11105 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 11105 may comprise, or may be, a special-purpose processor/controller to operate according to the various embodiments herein. As examples, the processor(s) of application circuitry 11105 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 11100 may not utilize application circuitry 11105, and instead may include a special-purpose processor/controller to process IP data received from an EPC or 5GC, for example.

In some implementations, the application circuitry 11105 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 11105 may comprise logic blocks or logic fabric, and other interconnected resources that may be programmed to perform various functions, such as the procedures, methods, functions, etc. of the various embodiments discussed herein. In such embodiments, the circuitry of application circuitry 11105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 11110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 11110 are discussed infra with regard to FIG. 12.

User interface circuitry 11150 may include one or more user interfaces designed to enable user interaction with the system 11100 or peripheral component interfaces designed to enable peripheral component interaction with the system 11100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 11115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 11115, which incorporates both mmWave antennas and sub-mmWave.

The memory circuitry 11120 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 11120 may be implemented as one or more of solder down packaged integrated circuits, socketed memory modules and plug-in memory cards.

The PMIC 11125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 11130 may provide for electrical power drawn from a network cable to provide both power supply and data connectivity to the infrastructure equipment 11100 using a single cable.

The network controller circuitry 11135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 11100 via network interface connector 11140 using a physical connection, which may be electrical (commonly referred to as a "copper interconnect"), optical, or wireless. The network controller circuitry 11135 may include one or more dedicated processors and/or FPGAs to communicate using one or more of the aforementioned protocols. In some implementations, the network controller circuitry 11135 may include multiple controllers to provide connectivity to other networks using the same or different protocols.

The positioning circuitry 11145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 11145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 11145 may include a Micro-Technology for Positioning, Navigation, and Timing (Micro-PNT) IC that uses a master timing clock to perform position tracking/estimation without GNSS assistance. The positioning circuitry 11145 may also be part of, or interact with, the baseband circuitry 11110 and/or RFEMs 11115 to communicate with the nodes and components of the positioning network. The positioning circuitry 11145 may also provide position data and/or time data to the application circuitry 11105, which may use the data to synchronize operations with various infrastructure (e.g., RAN nodes 1011, etc.), or the like.

The components shown by FIG. 11A may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 11B:
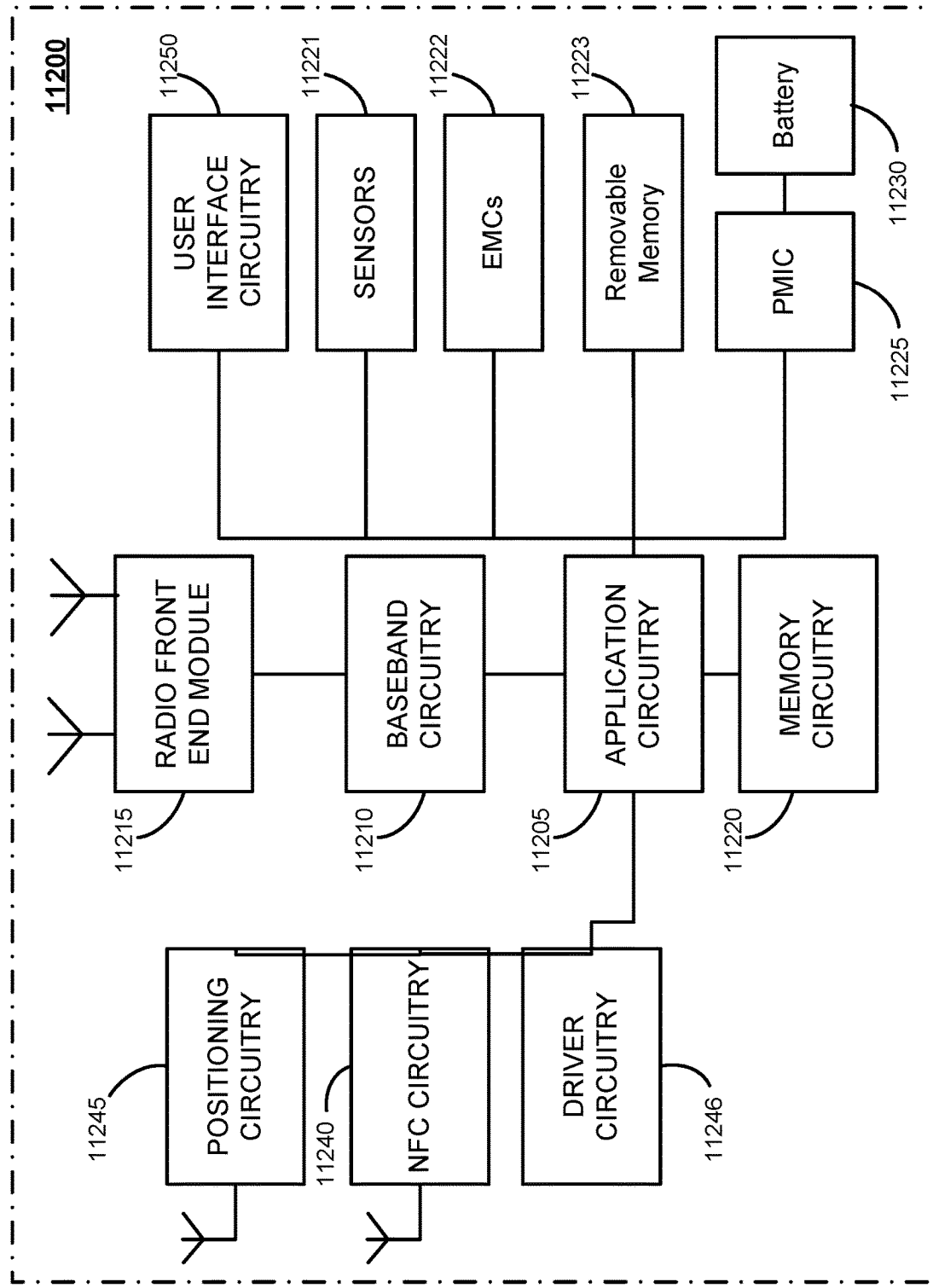
FIG. 11B illustrates an example of a computer platform in accordance with various embodiments.

FIG. 11B illustrates an example of a platform 11200 (or "device 11200") in accordance with various embodiments. In embodiments, the computer platform 11200 may be suitable for use as UEs 1001, application servers 1030, and/or any other element/device discussed herein. The platform 11200 may include any combinations of the components shown in the example. The components of platform 11200 may be implemented as integrated circuits (ICs), portions thereof, discrete electronic devices, or other modules, logic, hardware, software, firmware, or a combination thereof adapted in the computer platform 11200, or as components otherwise incorporated within a chassis of a larger system. The block diagram of FIG. 11B is intended to show a high level view of components of the computer platform 11200. However, some of the components shown may be omitted, additional components may be present, and different arrangement of the components shown may occur in other implementations.

Application circuitry 11205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 11205 may be coupled with or may include memory/storage elements and may be configured to execute instructions stored in the memory/storage to enable various applications or operating systems to run on the system 11200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 11105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 11105 may comprise, or may be, a special-purpose processor/controller to operate according to the various embodiments herein.

As examples, the processor(s) of application circuitry 11205 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 11205 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 11205 may be a part of a system on a chip (SoC) in which the application circuitry 11205 and other components are formed into a single integrated circuit, or a single package, such as the Edison™ or Galileo™ SoC boards from Intel® Corporation.

Additionally or alternatively, application circuitry 11205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 11205 may comprise logic blocks or logic fabric, and other interconnected resources that may be programmed to perform various functions, such as the procedures, methods, functions, etc. of the various embodiments discussed herein. In such embodiments, the circuitry of application circuitry 11205 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 11210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 11210 are discussed infra with regard to FIG. 12.

The RFEMs 11215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 11215, which incorporates both mmWave antennas and sub-mmWave.

The memory circuitry 11220 may include any number and type of memory devices used to provide for a given amount of system memory. As examples, the memory circuitry 11220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 11220 may be developed in accordance with a Joint Electron Devices Engineering Council (JEDEC) low power double data rate (LPDDR)-based design, such as LPDDR2, LPDDR3, LPDDR4, or the like. Memory circuitry 11220 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 11220 may be on-die memory or registers associated with the application circuitry 11205. To provide for persistent storage of information such as data, applications, operating systems and so forth, memory circuitry 11220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 11200 may incorporate the three-dimensional (3D) cross-point (XPOINT) memories from Intel® and Micron®.

Removable memory circuitry 11223 may include devices, circuitry, enclosures/housings, ports or receptacles, etc. used to couple portable data storage devices with the platform 11200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 11200 may also include interface circuitry (not shown) that is used to connect external devices with the platform 11200. The external devices connected to the platform 11200 via the interface circuitry include sensor circuitry 11221 and electro-mechanical components (EMCs) 11222, as well as removable memory devices coupled to removable memory circuitry 11223.

The sensor circuitry 11221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 11222 include devices, modules, or subsystems whose purpose is to enable platform 11200 to change its state, position, and/or orientation, or move or control a mechanism or (sub)system. Additionally, EMCs 11222 may be configured to generate and send messages/signalling to other components of the platform 11200 to indicate a current state of the EMCs 11222. Examples of the EMCs 11222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 11200 is configured to operate one or more EMCs 11222 based on one or more captured events and/or instructions or control signals received from a service provider and/or various clients.

In some implementations, the interface circuitry may connect the platform 11200 with positioning circuitry 11245. The positioning circuitry 11245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 11245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 11245 may include a Micro-PNT IC that uses a master timing clock to perform position tracking/estimation without GNSS assistance. The positioning circuitry 11245 may also be part of, or interact with, the baseband circuitry 11110 and/or RFEMs 11215 to communicate with the nodes and components of the positioning network. The positioning circuitry 11245 may also provide position data and/or time data to the application circuitry 11205, which may use the data to synchronize operations with various infrastructure (e.g., radio base stations), for turn-by-turn navigation applications, or the like In some implementations, the interface circuitry may connect the platform 11200 with Near-Field Communication (NFC) circuitry 11240. NFC circuitry 11240 is configured to provide contactless, short-range communications based on radio frequency identification (RFID) standards, wherein magnetic field induction is used to enable communication between NFC circuitry 11240 and NFC-enabled devices external to the platform 11200 (e.g., an "NFC touchpoint"). NFC circuitry 11240 comprises an NFC controller coupled with an antenna element and a processor coupled with the NFC controller. The NFC controller may be a chip/IC providing NFC functionalities to the NFC circuitry 11240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 11240, or initiate data transfer between the NFC circuitry 11240 and another active NFC device (e.g., a smartphone or an NFC-enabled POS terminal) that is proximate to the platform 11200.

The driver circuitry 11246 may include software and hardware elements that operate to control particular devices that are embedded in the platform 11200, attached to the platform 11200, or otherwise communicatively coupled with the platform 11200. The driver circuitry 11246 may include individual drivers allowing other components of the platform 11200 to interact with or control various input/output (I/O) devices that may be present within, or connected to, the platform 11200. For example, driver circuitry 11246 may include a display driver to control and allow access to a display device, a touchscreen driver to control and allow access to a touchscreen interface of the platform 11200, sensor drivers to obtain sensor readings of sensor circuitry 11221 and control and allow access to sensor circuitry 11221, EMC drivers to obtain actuator positions of the EMCs 11222 and/or control and allow access to the EMCs 11222, a camera driver to control and allow access to an embedded image capture device, audio drivers to control and allow access to one or more audio devices.

The power management integrated circuitry (PMIC) 11225 (also referred to as "power management circuitry 11225") may manage power provided to various components of the platform 11200. In particular, with respect to the baseband circuitry 11210, the PMIC 11225 may control power-source selection, voltage scaling, battery charging, or DC-to-DC conversion. The PMIC 11225 may often be included when the platform 11200 is capable of being powered by a battery 11230, for example, when the device is included in a UE 1001.

In some embodiments, the PMIC 11225 may control, or otherwise be part of, various power saving mechanisms of the platform 11200. For example, if the platform 11200 is in an RRC_Connected state, where it is still connected to the RAN node as it expects to receive traffic shortly, then it may enter a state known as Discontinuous Reception Mode (DRX) after a period of inactivity. During this state, the platform 11200 may power down for brief intervals of time and thus save power. If there is no data traffic activity for an extended period of time, then the platform 11200 may transition off to an RRC_Idle state, where it disconnects from the network and does not perform operations such as channel quality feedback, handover, etc. The platform 11200 goes into a very low power state and it performs paging where again it periodically wakes up to listen to the network and then powers down again. The platform 11200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 11230 may power the platform 11200, although in some examples the platform 11200 may be mounted deployed in a fixed location, and may have a power supply coupled to an electrical grid. The battery 11230 may be a lithium ion battery, a metal-air battery, such as a zinc-air battery, an aluminum-air battery, a lithium-air battery, and the like. In some implementations, such as in V2X applications, the battery 11230 may be a typical lead-acid automotive battery.

In some implementations, the battery 11230 may be a "smart battery," which includes or is coupled with a Battery Management System (BMS) or battery monitoring integrated circuitry. The BMS may be included in the platform 11200 to track the state of charge (SoCh) of the battery 11230. The BMS may be used to monitor other parameters of the battery 11230 to provide failure predictions, such as the state of health (SoH) and the state of function (SoF) of the battery 11230. The BMS may communicate the information of the battery 11230 to the application circuitry 11205 or other components of the platform 11200. The BMS may also include an analog-to-digital (ADC) convertor that allows the application circuitry 11205 to directly monitor the voltage of the battery 11230 or the current flow from the battery 11230. The battery parameters may be used to determine actions that the platform 11200 may perform, such as transmission frequency, network operation, sensing frequency, and the like.

A power block, or other power supply coupled to an electrical grid may be coupled with the BMS to charge the battery 11230. In some examples, the power block 1130 may be replaced with a wireless power receiver to obtain the power wirelessly, for example, through a loop antenna in the computer platform 11200. In these examples, a wireless battery charging circuit may be included in the BMS. The specific charging circuits chosen may depend on the size of the battery 11230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 11250 includes various input/output (I/O) devices present within, or connected to, the platform 11200, and includes one or more user interfaces designed to enable user interaction with the platform 11200 and/or peripheral component interfaces designed to enable peripheral component interaction with the platform 11200. The user interface circuitry 11250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 11200. The output device circuitry may also include speakers or other audio emitting devices, printer(s), and/or the like. In some embodiments, the sensor circuitry 11221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 11200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 12:
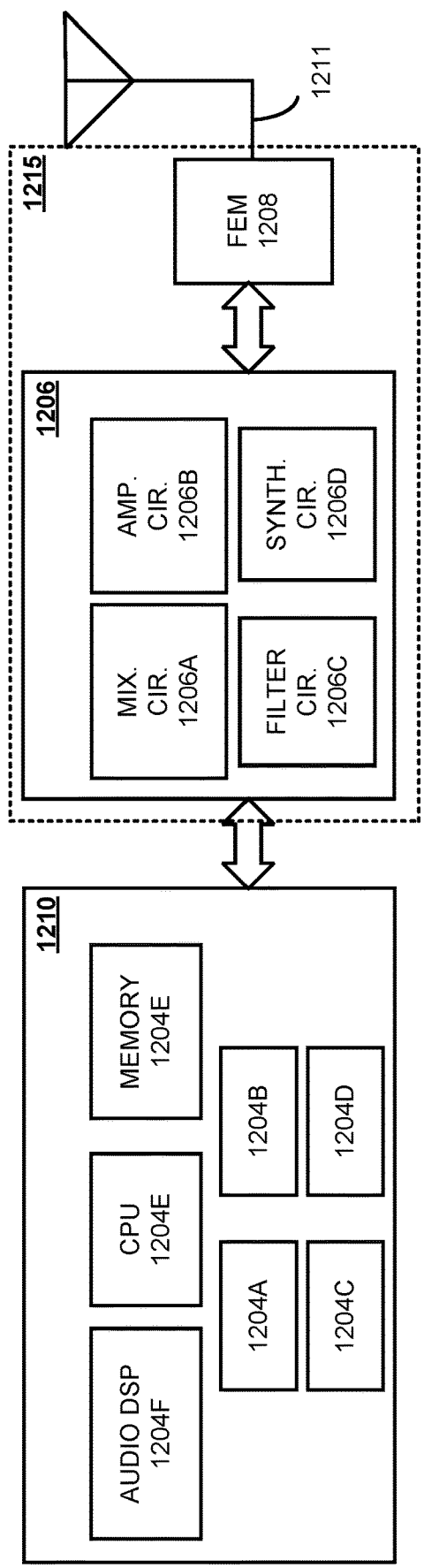
FIG. 12 illustrates example components of baseband circuitry and radio front end modules in accordance with various embodiments.

FIG. 12 illustrates example components of baseband circuitry 1210 and radio front end modules (RFEM) 1215 in accordance with various embodiments. The baseband circuitry 1210 corresponds to the baseband circuitry 11110 and 11210 of FIGS. 11A and 11B, respectively. The RFEM 1215 corresponds to the RFEM 11115 and 11215 of FIGS. 11A and 11B, respectively. As shown, the RFEMs 1215 may include Radio Frequency (RF) circuitry 1206, front-end module (FEM) circuitry 1208, antenna array 1211 coupled together at least as shown.

The baseband circuitry 1210 includes circuitry and/or control logic configured to carry out various radio/network protocol and radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1210 may include Fast-Fourier Transform (FFT), precoding, or constellation mapping/demapping functionality. In some embodiments, encoding/decoding circuitry of the baseband circuitry 1210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1210 is configured to process baseband signals received from a receive signal path of the RF circuitry 1206 and to generate baseband signals for a transmit signal path of the RF circuitry 1206. The baseband circuitry 1210 is configured to interface with application circuitry 11105/11205 (see FIGS. 11A and 11B) for generation and processing of the baseband signals and for controlling operations of the RF circuitry 1206. The baseband circuitry 1210 may handle various radio control functions.

The aforementioned circuitry and/or control logic of the baseband circuitry 1210 may include one or more single or multi-core processors. For example, the one or more processors may include a 3G baseband processor 1204A, a 4G/LTE baseband processor 1204B, a 5G/NR baseband processor 1204C, or some other baseband processor(s) 1204D for other existing generations, generations in development or to be developed in the future (e.g., sixth generation (6G), etc.). In other embodiments, some or all of the functionality of baseband processors 1204A-D may be included in modules stored in the memory 1204G and executed via a Central Processing Unit (CPU) 1204E. In other embodiments, some or all of the functionality of baseband processors 1204A-D may be provided as hardware accelerators (e.g., FPGAs, ASICs, etc.) loaded with the appropriate bit streams or logic blocks stored in respective memory cells. In various embodiments, the memory 1204G may store program code of a real-time OS (RTOS), which when executed by the CPU 1204E (or other baseband processor), is to cause the CPU 1204E (or other baseband processor) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1210 includes one or more audio digital signal processor(s) (DSP) 1204F. The audio DSP(s) 1204F include elements for compression/decompression and echo cancellation and may include other suitable processing elements in other embodiments.

In some embodiments, each of the processors 1204A-1204E include respective memory interfaces to send/receive data to/from the memory 1204G. The baseband circuitry 1210 may further include one or more interfaces to communicatively couple to other circuitries/devices, such as an interface to send/receive data to/from memory external to the baseband circuitry 1210; an application circuitry interface to send/receive data to/from the application circuitry 11105/11205 of FIGS. 11A-12); an RF circuitry interface to send/receive data to/from RF circuitry 1206 of FIG. 12; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 11225.

In alternate embodiments (which may be combined with the above described embodiments), baseband circuitry 1210 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1210 may include protocol processing circuitry with one or more instances of control circuitry (not shown) to provide control functions for the digital baseband circuitry and/or radio frequency circuitry (e.g., the radio front end modules 1215).

Although not shown by FIG. 12, in some embodiments, the baseband circuitry 1210 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1210 and/or RF circuitry 1206 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1210 and/or RF circuitry 1206 are part of a Wi-Fi communication system. In the second example, the protocol processing circuitry would operate Wi-Fi MAC and logical link control (LLC) functions. The protocol processing circuitry may include one or more memory structures (e.g., 1204G) to store program code and data for operating the protocol functions, as well as one or more processing cores to execute the program code and perform various operations using the data. The baseband circuitry 1210 may also support radio communications for more than one wireless protocol.

The various hardware elements of the baseband circuitry 1210 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1210 may be suitably combined in a single chip or chipset, or disposed on a same circuit board. In another example, some or all of the constituent components of the baseband circuitry 1210 and RF circuitry 1206 may be implemented together such as, for example, a system on a chip (SoC) or System-in-Package (SiP). In another example, some or all of the constituent components of the baseband circuitry 1210 may be implemented as a separate SoC that is communicatively coupled with and RF circuitry 1206 (or multiple instances of RF circuitry 1206). In yet another example, some or all of the constituent components of the baseband circuitry 1210 and the application circuitry 11105/11205 may be implemented together as individual SoCs mounted to a same circuit board (e.g., a "multi-chip package").

In some embodiments, the baseband circuitry 1210 may provide for communication compatible with one or more radio technologies. For example, in some embodiments, the baseband circuitry 1210 may support communication with an E-UTRAN or other WMAN, a WLAN, a WPAN. Embodiments in which the baseband circuitry 1210 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path, which may include circuitry to down-convert RF signals received from the FEM circuitry 1208 and provide baseband signals to the baseband circuitry 1210. RF circuitry 1206 may also include a transmit signal path, which may include circuitry to up-convert baseband signals provided by the baseband circuitry 1210 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1210 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1210 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a of the transmit signal path may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1210 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206*d* may be a fractional-N synthesizer or a fractional N/N+1 synthesizer, although the scope of the embodiments is not limited in this respect as other types of frequency synthesizers may be suitable. For example, synthesizer circuitry 1206*d* may be a delta-sigma synthesizer, a frequency multiplier, or a synthesizer comprising a phase-locked loop with a frequency divider.

The synthesizer circuitry 1206*d* may be configured to synthesize an output frequency for use by the mixer circuitry 1206*a* of the RF circuitry 1206 based on a frequency input and a divider control input. In some embodiments, the synthesizer circuitry 1206*d* may be a fractional N/N+1 synthesizer.

In some embodiments, frequency input may be provided by a voltage controlled oscillator (VCO), although that is not a requirement. Divider control input may be provided by either the baseband circuitry 1210 or the application circuitry 11105/11205 depending on the desired output frequency. In some embodiments, a divider control input (e.g., N) may be determined from a look-up table based on a channel indicated by the application circuitry 11105/11205.

Synthesizer circuitry 1206*d* of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path, which may include circuitry configured to operate on RF signals received from antenna array 1211, amplify the received signals and provide the amplified versions of the received signals to the RF circuitry 1206 for further processing. FEM circuitry 1208 may also include a transmit signal path, which may include circuitry configured to amplify signals for transmission provided by the RF circuitry 1206 for transmission by one or more of antenna elements of antenna array 1211. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission by one or more antenna elements of the antenna array 1211.

The antenna array 1211 comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array 1211 including one or more antenna elements (not shown). The antenna elements may be omnidirectional, direction, or a combination thereof. The antenna elements may be formed in a multitude of arranges as are known and/or discussed herein. The antenna array 1211 may comprise microstrip antennas or printed antennas that are fabricated on the surface of one or more printed circuit boards. The antenna array 1211 may be formed in as a patch of metal foil (e.g., a patch antenna) in a variety of shapes, and may be coupled with the RF circuitry 1206 and/or FEM circuitry 1208 using metal transmission lines or the like.

Processors of the application circuitry 11105/11205 and processors of the baseband circuitry 1210 may be used to execute elements of one or more instances of a protocol stack. For example, processors of the baseband circuitry 1210, alone or in combination, may be used execute Layer 3, Layer 2, or Layer 1 functionality, while processors of the application circuitry 11105/11205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 13:
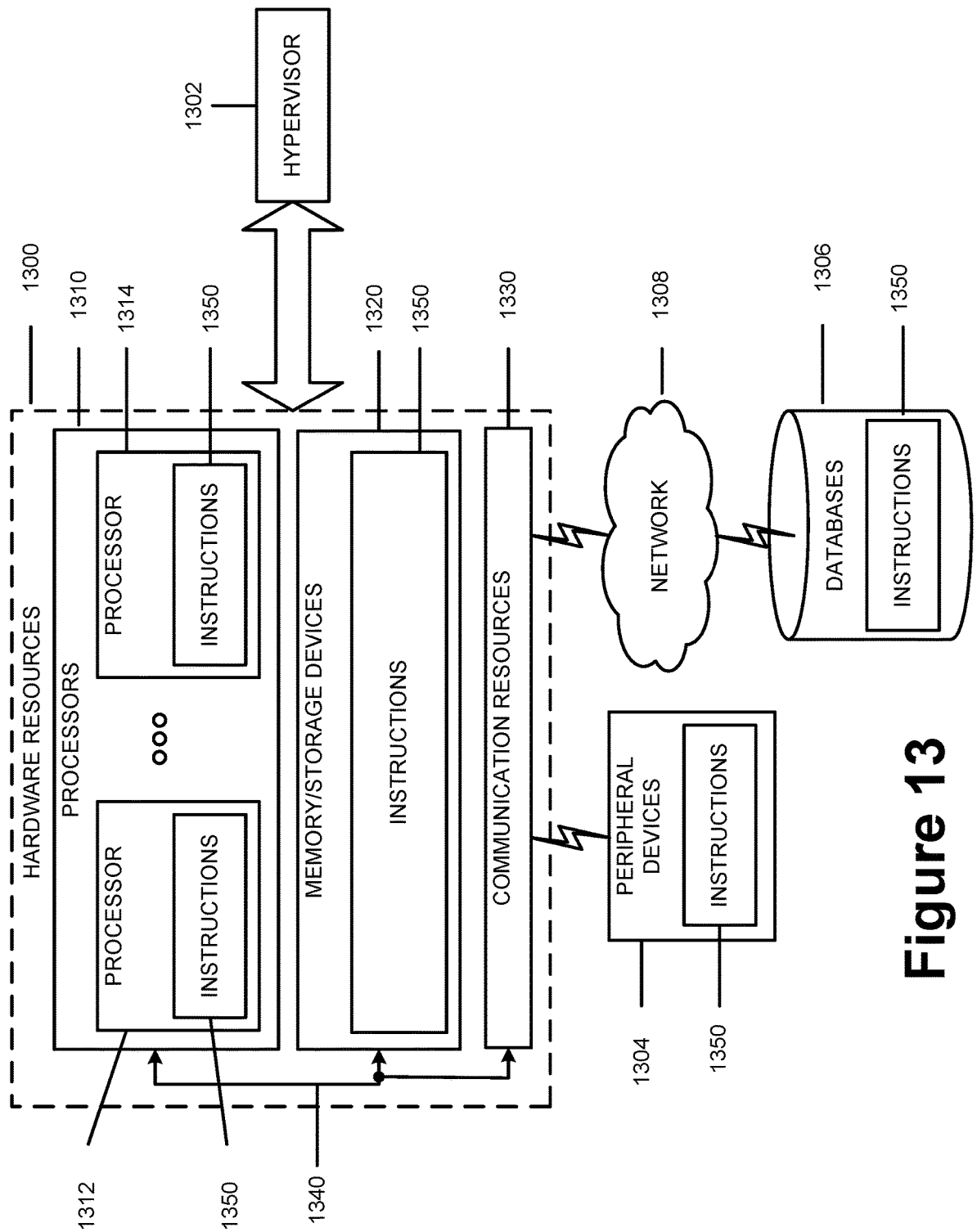
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (e.g., NFV) is utilized, a hypervisor 1302 may be executed to provide an execution environment for one or more network slices/sub-slices to utilize the hardware resources 1300.

The processors 1310 may include, for example, a processor 1312 and a processor 1314. The processor(s) 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via USB), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

Example Procedures

Figure 9A:
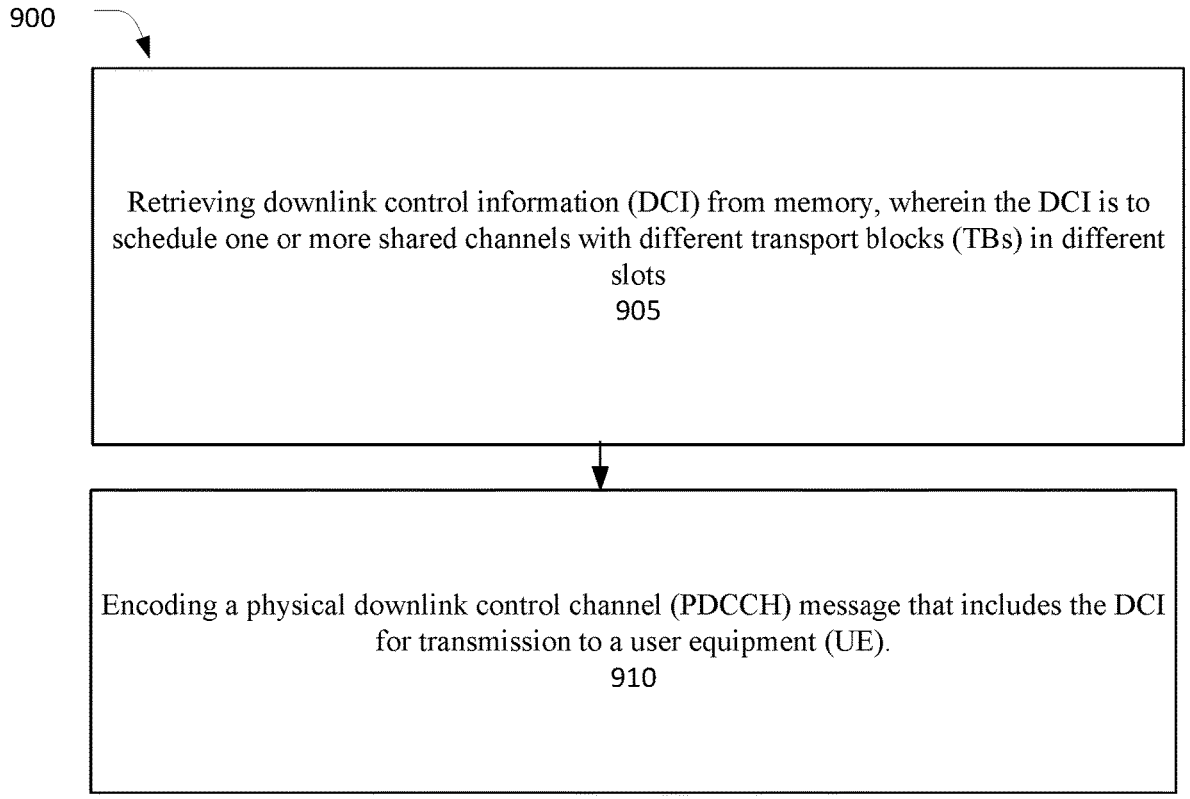
FIGS. 9A, 9B, and 9C illustrate examples of operation flow/algorithmic structures in accordance with some embodiments.

In some embodiments, the electronic device(s), network(s), system(s), chip(s) or component(s), or portions or implementations thereof, of FIGS. 10-13, or some other figure herein, may be configured to perform one or more processes, techniques, or methods as described herein, or portions thereof. One such process is depicted in FIG. 9A, which may be performed by a next-generation NodeB (gNB) or portion thereof in some embodiments. For example, the process 900 may include, at 905, retrieving downlink control information (DCI) from memory, wherein the DCI is to schedule one or more shared channels with different transport blocks (TBs) in different slots. The process further includes, at 910, encoding a physical downlink control channel (PDCCH) message that includes the DCI for transmission to a user equipment (UE).

Figure 9B:
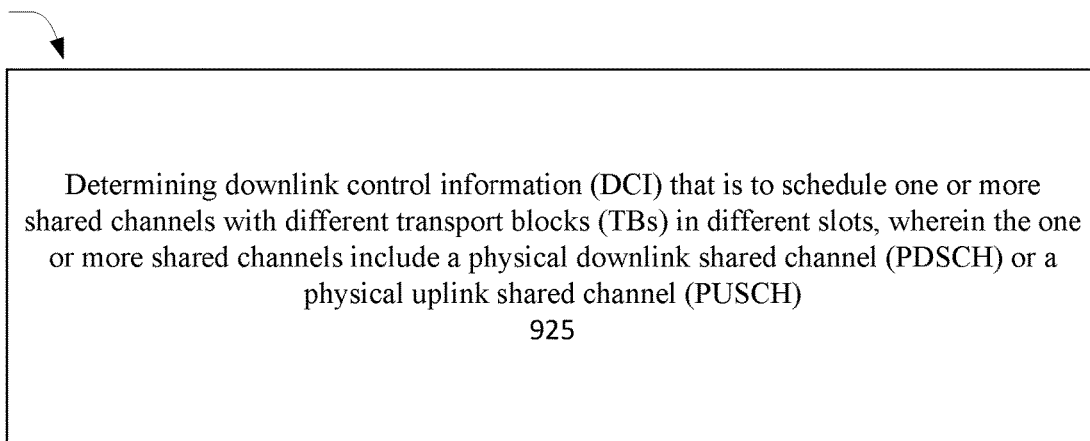
Figure 9B:
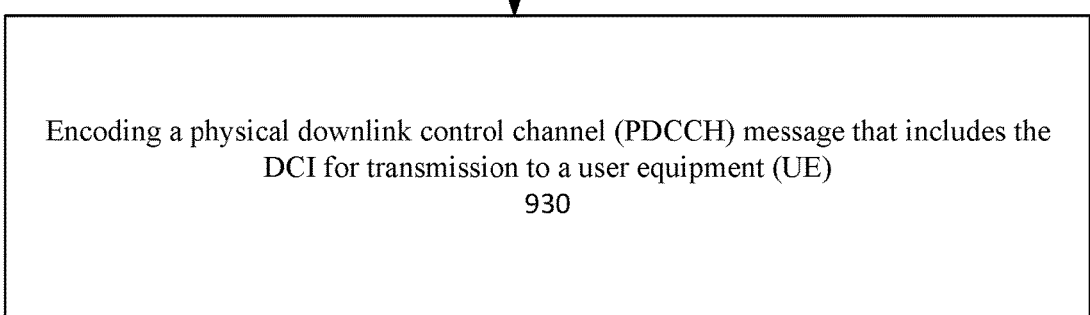

Another such process is illustrated in FIG. 9B, which may be performed by a next-generation NodeB (gNB) or portion thereof in some embodiments. For example, the process 920 may include, at 925, determining downlink control information (DCI) that is to schedule one or more shared channels with different transport blocks (TBs) in different slots, wherein the one or more shared channels include a physical downlink shared channel (PDSCH) or a physical uplink shared channel (PUSCH). The process further includes, at 930, encoding a physical downlink control channel (PDCCH) message that includes the DCI for transmission to a user equipment (UE).

Figure 9C:
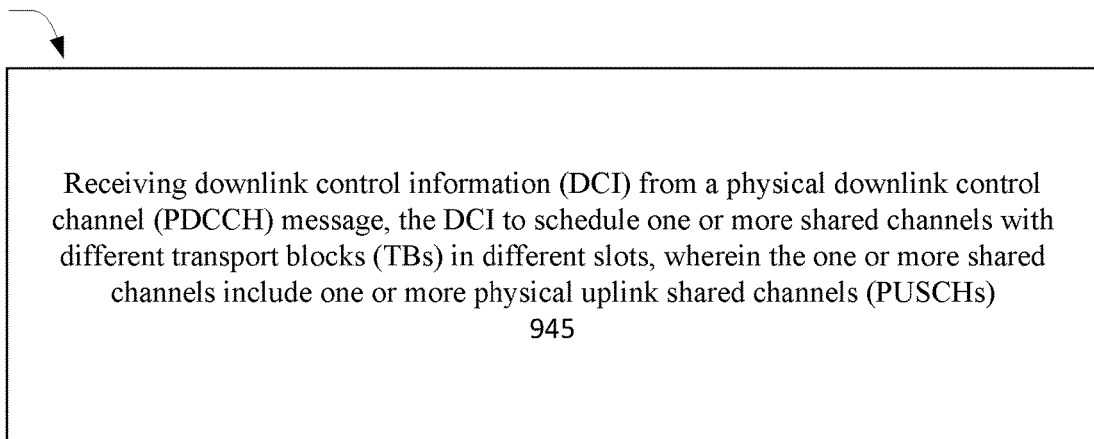
Figure 9C:
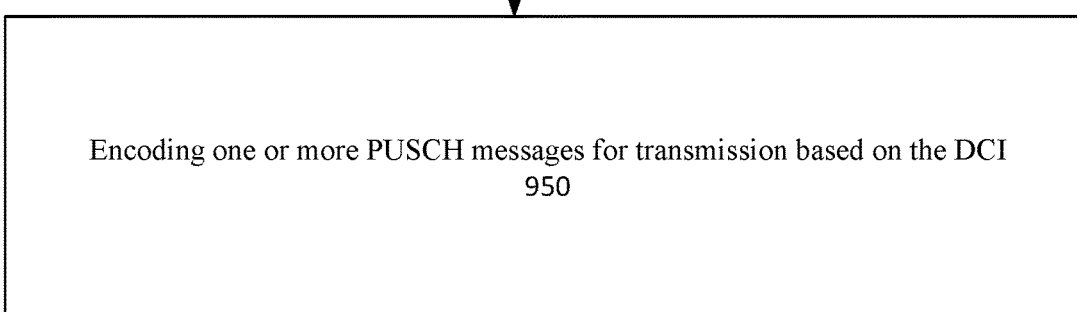

Another such process is illustrated in FIG. 9C, which may be performed by a user equipment (UE) or portion thereof in some embodiments. In this example, the process 940 includes, at 945, receiving downlink control information (DCI) from a physical downlink control channel (PDCCH) message, the DCI to schedule one or more shared channels with different transport blocks (TBs) in different slots, wherein the one or more shared channels include one or more physical uplink shared channels (PUSCHs). The process further includes, at 950, encoding one or more PUSCH messages for transmission based on the DCI.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of wireless communication for a fifth generation (5G) or new radio (NR) system, the method comprising:
    decoding, by a user equipment (UE), a downlink control information (DCI) from physical downlink control channel (PDCCH);
    decoding, by the UE, one or more physical downlink shared channels (PDSCH) which are scheduled by the DCI; and
    transmitting, by the UE, one or more physical uplink shared channels (PUSCH) which are scheduled by the DCI.

Example 2 may include the method of example 1, wherein in the DCI for scheduling multiple PDSCHs and/or PUSCHs with different TBs, each PDSCH and/or PUSCH may be scheduled within a slot.

Example 3 may include the method of example 1, wherein some fields in the DCI may be common for the scheduling of multiple PDSCHs and/or PUSCHs, while other fields may be independent for the scheduling of multiple PDSCHs and/or PUSCHs.

Example 4 may include the method of example 1, wherein carrier indicator and bandwidth part (BWP) indicator demodulation reference signal (DMRS) configuration, transmission configuration indication (TCI), sounding reference signal (SRS) resource indicator, frequency domain resource allocation, and transmit power command (TPC) for PUCCH for scheduled PDSCHs and/or PUSCHs with different TBs may be the same Example 5 may include the method of example 1, wherein new data indicator (NDI) may be independent for each scheduled PDSCH and/or PUSCH with different TBs;

wherein redundancy version (RV) may be independent for each scheduled PDSCH and/or PUSCH with different TBs.

Example 6 may include the method of example 1, wherein the DCI could schedule N·M PDSCHs and/or PUSCHs where N TBs are scheduled by the DCI with each TB mapped to M consecutive PDSCHs and/or PUSCHs. NDI could be indicated for each TB separately.

Example 7 may include the method of example 1, wherein a single modulation and coding scheme (MCS) field may be included in the DCI, which can be used to indicate the MCS of all the scheduled PDSCHs and/or PUSCHs.

Example 8 may include the method of example 1, wherein HARQ process number can be different for scheduled PDSCHs and/or PUSCHs.

Example 9 may include the method of example 1, wherein, a single HARQ process number field can be included in the DCI. The HARQ process number field is used to indicate the HARQ process number of the first PDSCH and/or PUSCH, while the HARQ process numbers for the remaining scheduled PDSCHs and/or PUSCHs can be implicitly determined in accordance with the indicated HARQ process number for the first PDSCH and/or PUSCH.

Example 10 may include the method of example 1, wherein a list of HARQ process number set can be configured by higher layers via MSI, RMSI, OSI or RRC signalling for multiple scheduled PDSCHs, and a field in the DCI may be used to indicate which one is selected for HARQ process number of each scheduled PDSCHs.

Example 11 may include the method of example 1, wherein for time domain resource assignment for PDSCH, k0 is used to indicate the slot offset between PDCCH and the first scheduled PDSCH; wherein k2 is used to indicate the slot offset between PDCCH and the first scheduled PUSCH.

Example 12 may include the method of example 1, wherein same starting and length indicator value (SLIV) and mapping type as part of time domain resource assignment are applied for each scheduled PDSCHs and/or PUSCHs.

Example 13 may include the method of example 1, wherein different SLIV and mapping type as part of time domain resource assignment are applied for different scheduled PDSCHs and/or PUSCHs.

Example 14 may include the method of example 1, wherein consecutive time domain resource allocation can be employed for the scheduled PDSCHs and/or PUSCHs with different TBs.

Example 15 may include the method of example 1, wherein number of scheduled PDSCHs and/or PUSCHs with different TBs may be configured by higher layers via MSI, RMSI, OSI or RRC signalling, or implicitly or explicitly indicated in the DCI or a combination thereof.

Example 16 may include the method of example 1, wherein a set of number of scheduled PDSCH and/or PUSCHs with different TBs can be configured by higher layers via MSI, RMSI, OSI or RRC signalling, and further one field in the DCI may be used to explicitly indicate one value from the set of number of scheduled PDSCHs and/or PUSCHs with different TBs.

Example 17 may include the method of example 1, wherein time/frequency resource for DMRS for the multiple scheduled PDSCHs and/or PUSCHs could be designed separately or jointly.

Example 18 may include the method of example 1, wherein for multi-TTI scheduling for PDSCHs with different TBs, a single PUCCH resource indicator (PRI) may be used to indicate one or more PUCCH resources for carrying HARQ-ACK response of one or more scheduled PDSCHs.

Example 19 may include the method of example 1, same PDSCH-to-HARQ_feedback timing indicator is used to indicate the slot offset between each scheduled PDSCH and each PUCCH carrying HARQ-ACK feedback of the corresponding PDSCH.

Example 20 may include the method of example 1, single PDSCH-to-HARQ_feedback timing indicator is used to indicate the slot offset between the last scheduled PDSCH and one PUCCH Example 21 may include the method of example 1 or some other example herein, wherein a dynamic HARQ-ACK codebook is generated considering multi-TTI scheduling PDSCH transmissions with multiple TBs, which consists of two sub-codebooks.

Example 22 may include the method of example 21 or some other example herein, wherein the first sub-codebook carries HARQ-ACK bits for all TB based PDSCH transmissions scheduled by a DCI scheduling a single TTI, while the second sub-codebook carries HARQ-ACK bits for all other PDSCH transmissions.

Example 23 may include the method of example 21 or some other example herein, wherein the first sub-codebook carries HARQ-ACK bits for TB based PDSCH transmissions scheduled by a DCI scheduling one or two TBs, while the second sub-codebook carries HARQ-ACK bits for all other PDSCH transmissions.

Example 24 may include the method of example 21 or some other example herein, wherein the first sub-codebook carries HARQ-ACK bits for PDSCH transmissions scheduled by a DCI scheduling one or two TBs or two CBGs, while the second sub-codebook carries HARQ-ACK bits for all other PDSCH transmissions.

Example 25 includes a method comprising:
generating a physical downlink control channel (PDCCH) message that includes downlink control information (DCI), wherein the DCI is to schedule one or more shared channels with different transport blocks (TBs) in different slots; and
encoding the PDCCH message for transmission to a user equipment (UE).

Example 26 includes the method of example 29 or some other example herein, wherein the one or more shared channels include a physical downlink shared channel (PDSCH) or a physical uplink shared channel (PUSCH).

Example 27 includes the method of example 26 or some other example herein, wherein the DCI is to schedule four PDSCHs with different TBs.

Example 28 includes the method of example 26 or some other example herein, wherein the DCI is to schedule three PUSCHs with different TBs.

Example 29 includes the method of example 25 or some other example herein, wherein each respective of the one or more shared channels is scheduled within a respective slot.

Example 30 includes the method of example 25 or some other example herein, wherein a plurality of fields within the DCI are common among multiple shared channels.

Example 31 includes the method of example 30 or some other example herein, wherein a carrier indicator and a bandwidth part (BWP) indicator indicated in the DCI are the same for multiple shared channels.

Example 32 includes the method of example 30 or some other example herein, wherein a frequency domain resource allocation indicated in the DCI is the same for multiple shared channels.

Example 33 includes the method of example 25 or some other example herein, wherein a single transmission configuration indication (TCI) in the DCI is to be applied to transmission of a plurality of shared channels.

Example 34 includes the method of example 25 or some other example herein, wherein a single sounding reference signal (SRS) resource indicator in the DCI is to be applied to a plurality of shared channels.

Example 35 includes the method of example 25 or some other example herein, wherein the DCI includes an independent new data indicator (NDI) for each respective shared channel.

Example 36 includes the method of example 25 or some other example herein, further comprising generating a dynamic hybrid automatic repeat request-acknowledgement (HARQ-ACK) codebook for multiple transmit time interval (multi-TTI) scheduling for PDSCH transmissions with multiple transport blocks (TBs).

Example 37 includes the method of example 36 or some other example herein, wherein the dynamic HARQ-ACK codebook includes two concatenated sub-codebooks.

Example 38 includes the method of example 37 or some other example herein, wherein a first sub-codebook is to carry HARQ-ACK for TB-based PDSCH scheduling, and a second sub-codebook is for code block group (CBG) based PDSCH scheduling.

Example 39 includes the method of example 38 or some other example herein, wherein the first sub-codebook includes HARQ-ACK bits for all TB based PDSCH transmissions scheduled by a DCI scheduling a single TTI.

Example 40 includes the method of example 38 or some other example herein, wherein the second sub-codebook includes HARQ-ACK bits for CBG-based PDSCH transmissions and PDSCH transmissions scheduled by a DCI scheduling multiple TTIs.

Example 41 includes the method of any of examples 25-40 or some other example herein, wherein the method is performed by a next-generation NodeB (gNB) or portion thereof.

Example X1 includes an apparatus comprising: memory to store downlink control information (DCI); and processor circuitry, coupled with the memory, to: retrieve the DCI from the memory, wherein the DCI is to schedule one or more shared channels with different transport blocks (TBs) in different slots; and encode a physical downlink control channel (PDCCH) message that includes the DCI for transmission to a user equipment (UE).

Example X2 includes the apparatus of example X1 or some other example herein, wherein the one or more shared channels include a physical downlink shared channel (PDSCH) or a physical uplink shared channel (PUSCH).

Example X3 includes the apparatus of example X2 or some other example herein, wherein the DCI is to schedule four PDSCHs with different TBs, or the DCI is to schedule three PUSCHs with different TBs.

Example X4 includes the apparatus of example X1 or some other example herein, wherein each respective shared channel of the one or more shared channels is scheduled within a respective slot.

Example X5 includes the apparatus of example X1 or some other example herein, wherein a plurality of fields within the DCI are common among multiple shared channels, and wherein: a carrier indicator and a bandwidth part (BWP) indicator indicated in the DCI are the same for multiple shared channels; or a frequency domain resource allocation indicated in the DCI is the same for multiple shared channels.

Example X6 includes the apparatus of example X1 or some other example herein, wherein: a single transmission configuration indication (TCI) in the DCI is to be applied to transmission of a plurality of shared channels; or a single sounding reference signal (SRS) resource indicator in the DCI is to be applied to a plurality of shared channels; or the DCI includes an independent new data indicator (NDI) for each respective shared channel.

Example X7 includes the apparatus of example X1 or some other example herein, wherein the processing circuitry is further to generate a dynamic hybrid automatic repeat request-acknowledgement (HARQ-ACK) codebook for multiple transmit time interval (multi-TTI) scheduling for PDSCH transmissions with multiple transport blocks (TBs).

Example X8 includes the apparatus of example X7 or some other example herein, wherein the dynamic HARQ-ACK codebook includes two concatenated sub-codebooks, and wherein a first sub-codebook is to carry HARQ-ACK for TB-based PDSCH scheduling, and a second sub-codebook is for code block group (CBG) based PDSCH scheduling.

Example X9 includes the apparatus of example X8 or some other example herein, wherein the second sub-codebook includes HARQ-ACK bits for CBG-based PDSCH transmissions and PDSCH transmissions scheduled by a DCI scheduling multiple TTIs.

Example X10 includes one or more non-transitory computer-readable media storing instructions that, when executed by one or more processors, are to cause a next-generation NodeB (gNB) to: determine downlink control information (DCI) that is to schedule one or more shared channels with different transport blocks (TBs) in different slots, wherein the one or more shared channels include a physical downlink shared channel (PDSCH) or a physical uplink shared channel (PUSCH); and encode a physical downlink control channel (PDCCH) message that includes the DCI for transmission to a user equipment (UE).

Example X11 includes the one or more non-transitory computer-readable media of example X10 or some other example herein, wherein the DCI is to schedule four PDSCHs with different TBs, or the DCI is to schedule three PUSCHs with different TBs.

Example X12 includes the one or more non-transitory computer-readable media of example X10 or some other example herein, wherein each respective shared channel of the one or more shared channels is scheduled within a respective slot.

Example X13 includes the one or more non-transitory computer-readable media of example X10 or some other example herein, wherein a plurality of fields within the DCI are common among multiple shared channels, and wherein: a carrier indicator and a bandwidth part (BWP) indicator indicated in the DCI are the same for multiple shared channels; or a frequency domain resource allocation indicated in the DCI is the same for multiple shared channels.

Example X14 includes the one or more non-transitory computer-readable media of example X10 or some other example herein, wherein: a single transmission configuration indication (TCI) in the DCI is to be applied to transmission of a plurality of shared channels; or a single sounding reference signal (SRS) resource indicator in the DCI is to be applied to a plurality of shared channels; or the DCI includes an independent new data indicator (NDI) for each respective shared channel.

Example X15 includes the one or more non-transitory computer-readable media of example X10 or some other example herein, wherein the processing circuitry is further to generate a dynamic hybrid automatic repeat request-acknowledgement (HARQ-ACK) codebook for multiple transmit time interval (multi-TTI) scheduling for PDSCH transmissions with multiple transport blocks (TBs).

Example X16 includes the one or more non-transitory computer-readable media of example X15 or some other example herein, wherein the dynamic HARQ-ACK codebook includes two concatenated sub-codebooks, and wherein a first sub-codebook is to carry HARQ-ACK for TB-based PDSCH scheduling, and a second sub-codebook is for code block group (CBG) based PDSCH scheduling.

Example X17 includes the one or more non-transitory computer-readable media of example X16 or some other example herein, wherein the second sub-codebook includes HARQ-ACK bits for CBG-based PDSCH transmissions and PDSCH transmissions scheduled by a DCI scheduling multiple TTIs.

Example X18 includes one or more non-transitory computer-readable media storing instructions that, when executed by one or more processors, are to cause a user equipment (UE) to: receive downlink control information (DCI) from a physical downlink control channel (PDCCH) message, the DCI to schedule one or more shared channels with different transport blocks (TBs) in different slots, wherein the one or more shared channels include one or more physical uplink shared channels (PUSCHs); and encode one or more PUSCH messages for transmission based on the DCI.

Example X19 includes the one or more non-transitory computer-readable media of example X18 or some other example herein, wherein a plurality of fields within the DCI are common among multiple shared channels, and wherein: a carrier indicator and a bandwidth part (BWP) indicator indicated in the DCI are the same for multiple shared channels; or a frequency domain resource allocation indicated in the DCI is the same for multiple shared channels.

Example X20 includes the one or more non-transitory computer-readable media of example X18 or some other example herein, wherein: a single transmission configuration indication (TCI) in the DCI is to be applied to transmission of a plurality of shared channels; or a single sounding reference signal (SRS) resource indicator in the DCI is to be applied to a plurality of shared channels; or the DCI includes an independent new data indicator (NDI) for each respective shared channel.

Example Z01 may include an apparatus comprising means to perform one or more elements of a method described in or related to any of examples 1-X20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X20, or any other method or process described herein.

Example Z03 may include an apparatus comprising logic, modules, or circuitry to perform one or more elements of a method described in or related to any of examples 1-X20, or any other method or process described herein.

Example Z04 may include a method, technique, or process as described in or related to any of examples 1-X20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X20, or portions thereof.

Example Z06 may include a signal as described in or related to any of examples 1-X20, or portions or parts thereof.

Example Z07 may include a datagram, packet, frame, segment, protocol data unit (PDU), or message as described in or related to any of examples 1-X20, or portions or parts thereof, or otherwise described in the present disclosure.

Example Z08 may include a signal encoded with data as described in or related to any of examples 1-X20, or portions or parts thereof, or otherwise described in the present disclosure.

Example Z09 may include a signal encoded with a datagram, packet, frame, segment, protocol data unit (PDU), or message as described in or related to any of examples 1-X20, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X20, or portions thereof.

Example Z11 may include a computer program comprising instructions, wherein execution of the program by a processing element is to cause the processing element to carry out the method, techniques, or process as described in or related to any of examples 1-X20, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |

| | -continued |
|---|---|
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |

| | -continued |
|---|---|
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| | EN-DC E-UTRA-NR Dual Connectivity |
| EPC | Evolved Packet Core |
| EPDCCH, PDCCH, | enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Nex Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GSM | Global System for Mobile Communications, Groupe Spécial Mobile |
| GTP | GPRS Tunneling Protocol |

| | |
|---|---|
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH MTC | Physical Downlink Control CHannel |
| MPDSCH MTC | Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |

| | | | | |
|---|---|---|---|---|
| NM | Network Manager | | PSTN | Public Switched Telephone Network |
| NMS | Network Management System | | PT-RS | Phase-tracking reference signal |
| N-PoP | Network Point of Presence | | PTT | Push-to-Talk |
| NMIB, N-MIB | Narrowband MIB | | PUCCH | Physical Uplink Control Channel |
| NPBCH | Narrowband Physical Broadcast CHannel | | PUSCH | Physical Uplink Shared Channel |
| NPDCCH | Narrowband Physical Downlink Control CHannel | | QAM | Quadrature Amplitude Modulation |
| NPDSCH | Narrowband Physical Downlink Shared CHannel | | QCI | QoS class of identifier |
| NPRACH | Narrowband Physical Random Access CHannel | | QCL | Quasi co-location |
| NPUSCH | Narrowband Physical Uplink Shared CHannel | | QFI | QoS Flow ID, QoS Flow Identifier |
| NPSS | Narrowband Primary Synchronization Signal | | QoS | Quality of Service |
| NSSS | Narrowband Secondary Synchronization Signal | | QPSK | Quadrature (Quaternary) Phase Shift Keying |
| NR | New Radio, Neighbour Relation | | QZSS | Quasi-Zenith Satellite System |
| NRF | NF Repository Function | | RA-RNTI | Random Access RNTI |
| NRS | Narrowband Reference Signal | | RAB | Radio Access Bearer, Random Access Burst |
| NS | Network Service | | RACH | Random Access Channel |
| NSA | Non-Standalone operation mode | | RADIUS | Remote Authentication Dial In User Service |
| NSD | Network Service Descriptor | | RAN | Radio Access Network |
| NSR | Network Service Record | | RAND | RANDom number (used for authentication) |
| NSSAI | Network Slice Selection Assistance Information | | RAR | Random Access Response |
| S-NNSAI | Single-NSSAI NSSF Network Slice Selection Function | | RAT | Radio Access Technology |
| | | | RAU | Routing Area Update |
| NW | Network | | RB | Resource block, Radio Bearer |
| NWUS | Narrowband wake-up signal, Narrowband WUS | | RBG | Resource block group |
| NZP | Non-Zero Power | | REG | Resource Element Group |
| O&M | Operation and Maintenance | | Rel | Release |
| ODU2 | Optical channel Data Unit - type 2 | | REQ | REQuest |
| OFDM | Orthogonal Frequency Division Multiplexing | | RF | Radio Frequency |
| OFDMA | Orthogonal Frequency Division Multiple Access | | RI | Rank Indicator |
| OOB | Out-of-band | | RIV | Resource indicator value |
| OOS | Out of Sync | | RL | Radio Link |
| OPEX | OPerating EXpense | | RLC | Radio Link Control, Radio Link Control layer |
| OSI | Other System Information | | RLC AM RLC | Acknowledged Mode |
| OSS | Operations Support System | | RLC UM RLC | Unacknowledged Mode |
| OTA | over-the-air | | RLF | Radio Link Failure |
| PAPR | Peak-to-Average Power Ratio | | RLM | Radio Link Monitoring |
| PAR | Peak to Average Ratio | | RLM-RS | Reference Signal for RLM |
| PBCH | Physical Broadcast Channel | | RM | Registration Management |
| PC | Power Control, Personal Computer | | RMC | Reference Measurement Channel |
| PCC | Primary Component Carrier, Primary CC | | RMSI | Remaining MSI, Remaining Minimum System Information |
| PCell | Primary Cell | | | |
| PCI | Physical Cell ID, Physical Cell Identity | | RN | Relay Node |
| PCEF | Policy and Charging Enforcement Function | | RNC | Radio Network Controller |
| PCF | Policy Control Function | | RNL | Radio Network Layer |
| PCRF | Policy Control and Charging Rules Function | | RNTI | Radio Network Temporary Identifier |
| PDCP | Packet Data Convergence Protocol, Packet Data Convergence Protocol layer | | ROHC | RObust Header Compression |
| | | | RRC | Radio Resource Control, Radio Resource Control layer |
| PDCCH | Physical Downlink Control Channel | | | |
| PDCP | Packet Data Convergence Protocol | | RRM | Radio Resource Management |
| PDN | Packet Data Network, Public Data Network | | RS | Reference Signal |
| PDSCH | Physical Downlink Shared Channel | | RSRP | Reference Signal Received Power |
| PDU | Protocol Data Unit | | RSRQ | Reference Signal Received Quality |
| PEI | Permanent Equipment Identifiers | | RSSI | Received Signal Strength Indicator |
| PFD | Packet Flow Description | | RSU | Road Side Unit |
| P-GW | PDN Gateway | | RSTD | Reference Signal Time difference |
| PHICH | Physical hybrid-ARQ indicator channel | | RTP | Real Time Protocol |
| PHY | Physical layer | | RTS | Ready-To-Send |
| PLMN | Public Land Mobile Network | | RTT | Round Trip Time |
| PIN | Personal Identification Number | | Rx | Reception, Receiving, Receiver |
| PM | Performance Measurement | | S1AP | S1 Application Protocol |
| PMI | Precoding Matrix Indicator | | S1-MME | S1 for the control plane |
| PNF | Physical Network Function | | S1-U | S1 for the user plane |
| PNFD | Physical Network Function Descriptor | | S-GW | Serving Gateway |
| PNFR | Physical Network Function Record | | S-RNTI | SRNC Radio Network Temporary Identity |
| POC | PTT over Cellular | | S-TMSI | SAE Temporary Mobile Station Identifier |
| PP, PTP | Point-to-Point | | SA | Standalone operation mode |
| PPP | Point-to-Point Protocol | | SAE | System Architecture Evolution |
| PRACH | Physical RACH | | SAP | Service Access Point |
| PRB | Physical resource block | | SAPD | Service Access Point Descriptor |
| PRG | Physical resource block group | | SAPI | Service Access Point Identifier |
| ProSe | Proximity Services, Proximity-Based Service | | SCC | Secondary Component Carrier, Secondary CC |
| PRS | Positioning Reference Signal | | SCell | Secondary Cell |
| PRR | Packet Reception Radio | | SC-FDMA | Single Carrier Frequency Division Multiple Access |
| PS | Packet Services | | | |
| PSBCH | Physical Sidelink Broadcast Channel | | SCG | Secondary Cell Group |
| PSDCH | Physical Sidelink Downlink Channel | | SCM | Security Context Management |
| PSCCH | Physical Sidelink Control Channel | | SCS | Subcarrier Spacing |
| PSSCH | Physical Sidelink Shared Channel | | SCTP | Stream Control Transmission Protocol |
| PSCell | Primary SCell | | SDAP | Service Data Adaptation Protocol, Service Data Adaptation Protocol layer |
| PSS | Primary Synchronization Signal | | | |

| | |
|---|---|
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block, SS/PBCH Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFMVNF | Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:
memory to store downlink control information (DCI); and
processor circuitry, coupled with the memory, to:
  retrieve the DCI from the memory, wherein the DCI is to schedule a plurality of shared channels with different transport blocks (TB s) in different slots, wherein a plurality of fields within the DCI are common among the plurality of shared channels, wherein a carrier indicator and a bandwidth part (BWP) indicator indicated in the DCI are common for the plurality of shared channels, wherein the common carrier indicator is to indicate that a same component carrier (CC) is to be used for the plurality of shared channels, and wherein the common BWP indicator is to indicate that a same BWP is to be used for the plurality of shared channels; and
  encode a physical downlink control channel (PDCCH) message that includes the DCI for transmission to a user equipment (UE).

2. The apparatus of claim 1, wherein the plurality of shared channels include a physical downlink shared channel (PDSCH) or a physical uplink shared channel (PUSCH).

3. The apparatus of claim 2, wherein the DCI is to schedule four PDSCHs with different TBs, or the DCI is to schedule three PUSCHs with different TBs.

4. The apparatus of claim 1, wherein respective shared channels of the plurality of shared channels are scheduled within a respective slot of a plurality of slots.

5. The apparatus of claim 1, wherein:
a frequency domain resource allocation indicated in the DCI is common for the plurality of shared channels.

6. The apparatus of claim 1, wherein:
a single transmission configuration indication (TCI) in the DCI is to be applied to transmission of the plurality of shared channels; or
a single sounding reference signal (SRS) resource indicator in the DCI is to be applied to the plurality of shared channels; or
the DCI includes an independent new data indicator (NDI) for each respective shared channel of the plurality of shared channels.

7. The apparatus of claim 1, wherein the processor circuitry is further to generate a dynamic hybrid automatic repeat request-acknowledgement (HARQ-ACK) codebook for multiple transmit time interval (multi-TTI) scheduling for PDSCH transmissions with multiple transport blocks (TBs).

8. The apparatus of claim 7, wherein the dynamic HARQ-ACK codebook includes two concatenated sub-codebooks, and wherein a first sub-codebook is to carry HARQ-ACK for TB-based PDSCH scheduling, and a second sub-codebook is for code block group (CBG) based PDSCH scheduling.

9. The apparatus of claim 8, wherein the second sub-codebook includes HARQ-ACK bits for CBG-based PDSCH transmissions and PDSCH transmissions scheduled by a DCI scheduling multiple TTIs.

10. One or more non-transitory computer-readable media storing instructions that, when executed by one or more processors, are to cause a next-generation NodeB (gNB) to:
determine downlink control information (DCI) that is to schedule a plurality of shared channels with different transport blocks (TB s) in different slots, wherein the plurality of shared channels include a physical downlink shared channel (PDSCH) or a physical uplink shared channel (PUSCH), wherein a plurality of fields within the DCI are common among the plurality of shared channels, wherein a carrier indicator and a bandwidth part (BWP) indicator indicated in the DCI are common for multiple shared channels, wherein the common carrier indicator is to indicate that a same component carrier (CC) is to be used for the plurality of shared channels, and wherein the common BWP indicator is to indicate that a same BWP is to be used for the plurality of shared channels; and
encode a physical downlink control channel (PDCCH) message that includes the DCI for transmission to a user equipment (UE).

11. The one or more non-transitory computer-readable media of claim 10, wherein the DCI is to schedule four PDSCHs with different TBs, or the DCI is to schedule three PUSCHs with different TBs.

12. The one or more non-transitory computer-readable media of claim 10, wherein respective shared channels of the plurality of shared channels are scheduled within a respective slot of a plurality of slots.

13. The one or more non-transitory computer-readable media of claim 10, wherein:
a frequency domain resource allocation indicated in the DCI is common for the plurality of shared channels.

14. The one or more non-transitory computer-readable media of claim 10, wherein:
a single transmission configuration indication (TCI) in the DCI is to be applied to transmission of the plurality of shared channels; or
a single sounding reference signal (SRS) resource indicator in the DCI is to be applied to the plurality of shared channels; or
the DCI includes an independent new data indicator (NDI) for respective shared channels of the plurality of shared channels.

15. The one or more non-transitory computer-readable media of claim 10, wherein the one or more media further stores instructions to generate a dynamic hybrid automatic repeat request-acknowledgement (HARQ-ACK) codebook for multiple transmit time interval (multi-TTI) scheduling for PDSCH transmissions with multiple transport blocks (TBs).

16. The one or more non-transitory computer-readable media of claim 15, wherein the dynamic HARQ-ACK codebook includes two concatenated sub-codebooks, and wherein a first sub-codebook is to carry HARQ-ACK for TB-based PDSCH scheduling, and a second sub-codebook is for code block group (CBG) based PDSCH scheduling.

17. The one or more non-transitory computer-readable media of claim 16, wherein the second sub-codebook includes HARQ-ACK bits for CBG-based PDSCH transmissions and PDSCH transmissions scheduled by a DCI scheduling multiple TTIs.

18. One or more non-transitory computer-readable media storing instructions that, when executed by one or more processors, are to cause a user equipment (UE) to:
  receive downlink control information (DCI) from a physical downlink control channel (PDCCH) message, the DCI to schedule a plurality of shared channels with different transport blocks (TB s) in different slots, wherein the plurality of shared channels include one or more physical uplink shared channels (PUSCHs), wherein a plurality of fields within the DCI are common among the plurality of shared channels, wherein a carrier indicator and a bandwidth part (BWP) indicator indicated in the DCI are common for the plurality of shared channels, wherein the common carrier indicator is to indicate that a same component carrier (CC) is to be used for the plurality of shared channels, and wherein the common BWP indicator is to indicate that a same BWP is to be used for the plurality of shared channels; and
  encode one or more PUSCH messages for transmission based on the DCI.

19. The one or more non-transitory computer-readable media of claim 18, wherein:
  a frequency domain resource allocation indicated in the DCI is common for multiple the plurality of shared channels.

20. The one or more non-transitory computer-readable media of claim 18, wherein:
  a single transmission configuration indication (TCI) in the DCI is to be applied to transmission of the plurality of shared channels; or
  a single sounding reference signal (SRS) resource indicator in the DCI is to be applied to the plurality of shared channels; or
  the DCI includes an independent new data indicator (NDI) for respective shared channels of the plurality of shared channels.

\* \* \* \* \*

UNITED STATES PATENT AND TRADEMARK OFFICE
CERTIFICATE OF CORRECTION

PATENT NO. : 11,871,419 B2
APPLICATION NO. : 16/951926
DATED : January 9, 2024
INVENTOR(S) : Gang Xiong et al.

Page 1 of 1

It is certified that error appears in the above-identified patent and that said Letters Patent is hereby corrected as shown below:

In the Claims

Column 52
Line 10, remove "multiple" after "common for" and before "the plurality".

Signed and Sealed this
Twelfth Day of March, 2024

Katherine Kelly Vidal
*Director of the United States Patent and Trademark Office*